United States Patent
Kuramochi et al.

(10) Patent No.: US 12,515,671 B2
(45) Date of Patent: Jan. 6, 2026

(54) DRIVE ASSIST SYSTEM FOR VEHICLE

(71) Applicant: SUBARU CORPORATION, Tokyo (JP)

(72) Inventors: Hiroaki Kuramochi, Tokyo (JP); Masatoshi Minakawa, Tokyo (JP); Tetsuo Shiraishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/762,950

(22) Filed: Jul. 3, 2024

(65) Prior Publication Data
US 2025/0018949 A1 Jan. 16, 2025

(51) Int. Cl.
*B60W 30/18* (2012.01)
*G06V 20/56* (2022.01)
*G06V 20/58* (2022.01)

(52) U.S. Cl.
CPC ....... *B60W 30/18163* (2013.01); *G06V 20/58* (2022.01); *G06V 20/588* (2022.01); *B60W 2552/53* (2020.02); *B60W 2554/4041* (2020.02); *B60W 2554/4044* (2020.02)

(58) Field of Classification Search
CPC ....... B60W 30/18163; B60W 2552/53; B60W 2554/4041; B60W 2554/4044; B60W 30/12; B60W 10/06; B60W 10/18; B60W 10/20; B60W 10/30; B60W 2554/404; B60W 2554/80; B60W 2710/06; B60W 2710/18; B60W 2710/20; B60W 2710/30; G06V 20/58; G06V 20/588
See application file for complete search history.

(56) References Cited

U.S. PATENT DOCUMENTS 10,134,282 B2 * 11/2018 Tsuruta ................ G08G 1/166

FOREIGN PATENT DOCUMENTS

JP 2013-173383 A 9/2013

* cited by examiner

*Primary Examiner* — Xiao En Mo
(74) *Attorney, Agent, or Firm* — Rimon P.C.

(57) ABSTRACT

A drive assist system for a vehicle includes: a driving environment recognizer that recognizes driving environment information including a lane marking line and vehicles; a front vehicle extractor that extracts a front vehicle based on the driving environment information; A first driving state classifier that classifies a driving state of the vehicle as one of a first steady driving state, a first lane changing state, and a first target lane driving state, based on lateral movement information of the vehicle and relative position information of the vehicle to the lane marking line; and a second driving state classifier classifies a driving state of the front vehicle as one of a second steady driving state, a second lane changing state, and a second target lane driving state, based on lateral movement information of the front vehicle and relative position information of the front vehicle to the lane marking line.

3 Claims, 30 Drawing Sheets

DRIVE ASSIST SYSTEM FOR VEHICLE

CROSS-REFERENCE TO RELATED APPLICATIONS

The present application claims priority from Japanese Patent Application No. 2023-116108 filed on Jul. 14, 2023, the entire contents of which are hereby incorporated by reference.

BACKGROUND

The disclosure relates to a drive assist system for a vehicle, which suitably registers, as a leading vehicle, a vehicle driving in front of the vehicle which uses the drive assist system.

Lately, in the field of vehicles, such as automobiles, many vehicles loading a drive assist system have been put to practical use. Basically, the drive assist system implements drive assist control by executing various control operations, such as adaptive cruise control (ACC) and active lane keep centering (ALKC).

Basically, to perform ACC, the drive assist system selectively executes steady driving control and cruising control. The steady driving control is to maintain the velocity of a vehicle to a velocity set by a human driver. The drive assist system selects the steady driving control when a leading vehicle driving in front, which can be a cruising control target, is not registered. The cruising control is to maintain the distance between the vehicle using the drive assist system and a leading vehicle at a target distance. The drive assist system selects the cruising control when a vehicle registered as a leading vehicle is driving in front of the vehicle using the drive assist system.

Typically, the registration of a leading vehicle as a cruising control target is canceled when the vehicle using the drive assist system or the leading vehicle has started to change lanes. For example, Japanese Unexamined Patent Application Publication (JP-A) No. 2013-173383 discloses the following technology. When a front vehicle (leading vehicle) is found to have provided an instruction to change lanes with a direction indicator and has then started to change lanes, a drive assist system loaded in a vehicle determines whether to maintain or cancel cruising control (that is, whether to maintain or cancel the registration of the leading vehicle) after checking certain factors, such as whether a human driver driving the vehicle using the drive assist system intends to continue cruising control.

SUMMARY

An aspect of the disclosure provides a drive assist system configured to be applied to a vehicle. The drive assist system includes a driving environment recognizer, a front vehicle extractor, and first and second driving state classifiers. The driving environment recognizer is configured to recognize information on a driving environment including a lane marking line and one or more vehicles driving on a road. The lane marking lines is a line defining a lane on the road. The front vehicle extractor is configured to extract, as a front vehicle, one of the one or more vehicles that is driving in front of the vehicle to which the drive assist system is configured to be applied, based on the information on the driving environment. The first driving state classifier is configured to classify a driving state of the vehicle to which the drive assist system is configured to be applied as one of a first steady driving state, a first lane changing state, and a first target lane driving state, based on information on a movement of the vehicle in a lateral direction and information on a relative position of the vehicle to the lane marking line. The first steady driving state is a state in which the vehicle is steadily driving in the lane. The first lane changing state is a state in which the vehicle is changing the lane in the first steady driving state to a target lane adjacent to the lane. The first target lane driving state is a state in which the vehicle is driving in the target lane. The second driving state classifier is configured to classify a driving state of the front vehicle as one of a second steady driving state, a second lane changing state, and a second target lane driving state, based on information on a movement of the front vehicle in a lateral direction and information on a relative position of the front vehicle to the lane marking line. The second steady driving state is a state in which the front vehicle is steadily driving in the lane. The second lane changing state is a state in which the front vehicle is changing the lane in the second steady driving state to the target lane adjacent to the lane. The second target lane driving state is a state in which the front vehicle is driving in the target lane.

An aspect of the disclosure provides a drive assist system configured to be applied to a vehicle. The drive assist system includes a driving environment recognition unit and a processor. The driving environment recognition unit includes a sensor and is configured to recognize information on a driving environment including a lane marking line and one or more vehicles driving on a road. The lane marking line is a line defining a lane on the road. The processor is configured to extract, as a front vehicle, one of the one or more vehicles that is driving in front of the vehicle to which the drive assist system is configured to be applied, based on the information on the driving environment. The processor is configured to classify a driving state of the vehicle to which the drive assist system is configured to be applied as one of a first steady driving state, a first lane changing state, and a first target lane driving state, based on information on a movement of the vehicle in a lateral direction and information on a relative position of the vehicle to the lane marking line. The first steady driving state is a state in which the vehicle is steadily driving in the lane.

The first lane changing state is a state in which the vehicle is changing the lane in the first steady driving state to a target lane adjacent to the lane. The first target lane driving state is a state in which the vehicle is driving in the target lane. The processor is configured to classify a driving state of the front vehicle as one of a second steady driving state, a second lane changing state, and a second target lane driving state, based on information on a movement of the front vehicle in a lateral direction and information on a relative position of the front vehicle to the lane marking line. The second steady driving state is a state in which the front vehicle is steadily driving in the lane. The second lane changing state is a state in which the front vehicle is changing the lane in the second steady driving state to the target lane adjacent to the lane. The second target lane driving state is a state in which the front vehicle is driving in the target lane.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technology disclosed in JP-A No. 2013-173383, the registration of a leading vehicle is basically canceled when the leading vehicle has started to change lanes. For example, there may be a case in which, at the transition of a lane change of the leading vehicle, the vehicle using the drive assist system starts to change lanes in the same direction as the leading vehicle. Even in such a situation, the registration of the leading vehicle may temporarily be canceled unless the driver shows his/her intention to continue cruising control with a certain input operation.

To avoid such unwanted temporary deregistration of a leading vehicle, it may be desirable to monitor, based on suitable determination conditions, the transition of the driving state of a vehicle using a drive assist system and that of a front vehicle in certain situations, such as in a lane change scene where it becomes unclear in which lane the vehicle using the drive assist system and the front vehicle are driving.

To address the above-described issue, it is desirable to provide a drive assist system for a vehicle, which can suitably monitor the transition of the driving state of the vehicle and that of a front vehicle.

An embodiment of the disclosure will be described below with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
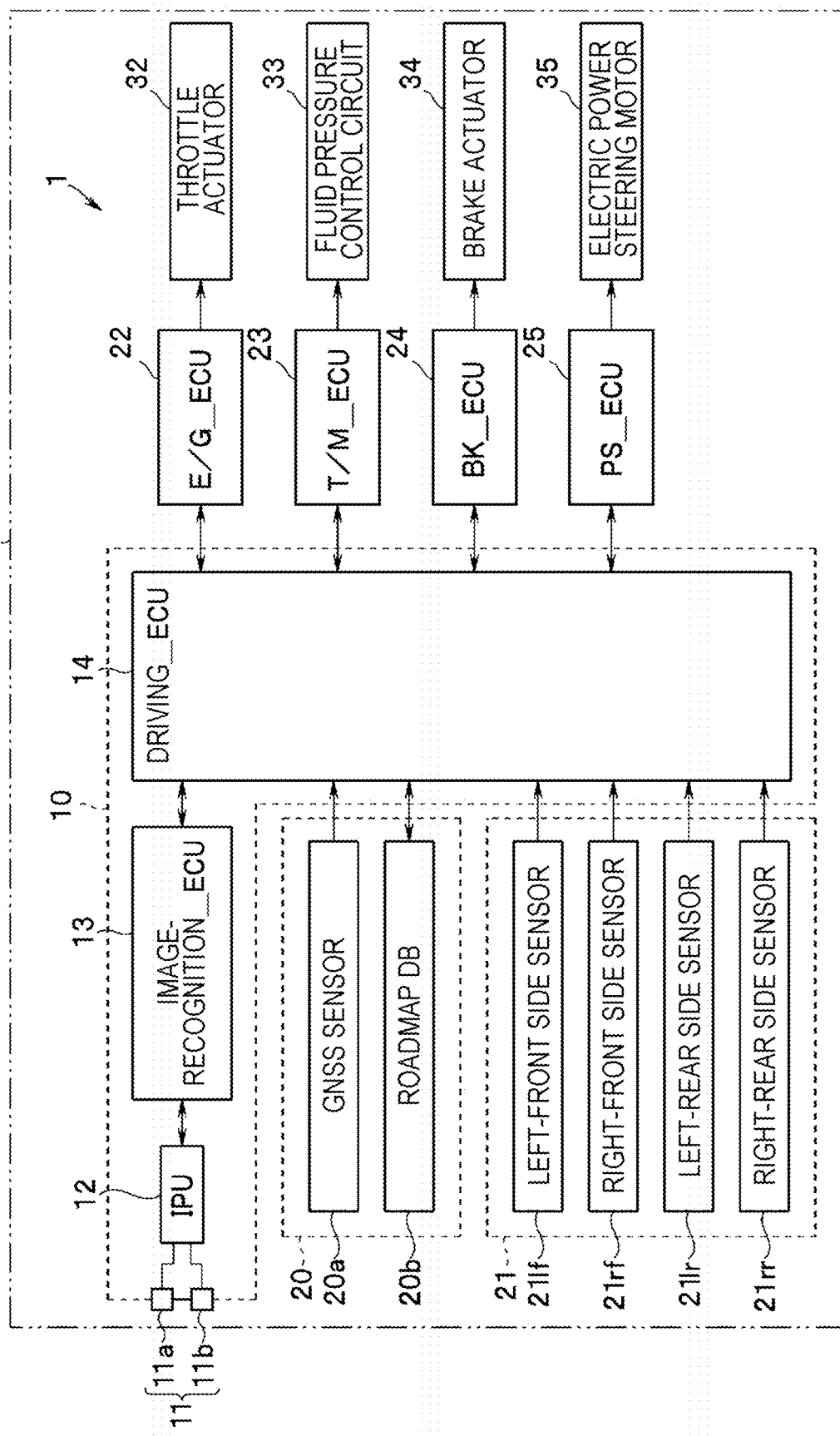
FIG. 1 is a schematic block diagram of a drive assist system for a vehicle.

FIG. 1 is a schematic block diagram of a drive assist system 1.

As illustrated in FIG. 1, the drive assist system 1 includes a camera unit 10. The camera unit 10 is fixed to the center of the top front section in a compartment of a vehicle O, for example.

The camera unit 10 includes a stereo camera 11, which serves as an imager, an image processing unit (IPU) 12, an image recognition unit (image-recognition_ECU) 13, and a driving control unit (driving_ECU) 14.

The stereo camera 11 includes a main camera 11a and a sub-camera 11b. The main camera 11a and the sub-camera 11b are constituted by imaging elements, such as complementary metal-oxide-semiconductors (CMOSs). The main camera 11a and the sub-camera 11b are disposed at horizontally symmetrical positions along the width of the vehicle O, for example. The main camera 11a and the sub-camera 11b perform stereo imaging from different viewpoints at preset imaging intervals synchronized with each other so as to image the driving environment in front of the vehicle O.

The IPU 12 performs predetermined image processing on images of the driving environment captured by the stereo camera 11 so as to detect edges of various objects, such as solid objects and marking lines on the road surface, included in the images. The IPU 12 also obtains distance information based on the positional disparity of the corresponding edges between the left and right images and generates image information including this distance information (hereinafter called distance image information).

Based on information, such as the distance image information, received from the IPU 12, the image-recognition_ECU 13 recognizes lane marking lines that define a lane on the road. For example, the image-recognition_ECU 13 determines the curvatures [1/m] of marking lines that define the left and right sides of each lane and also determines the width (lane width) between the left and right marking lines. The image-recognition_ECU 13 then calculates the lane width from the difference in the curvature between the left and right marking lines. As a result of such recognition processing for lane marking lines, the image-recognition_ECU 13 recognizes lanes on the road including a lane on which the vehicle O is driving (hereinafter called the lane of the vehicle O).

The image-recognition_ECU 13 also performs certain processing, such as predetermined pattern matching, on the distance image information so as to recognize objects, such as guardrails and curbs along the road, and other objects, such as surrounding vehicles driving on the road. For each object, the image-recognition_ECU 13 recognizes the type of object, distance to the object, velocity of the object, and relative velocity of the object to the vehicle O, for example.

In one embodiment, the stereo camera 11, the IPU 12, and the image-recognition_ECU 13 may serve as an example of a "driving environment recognizer (driving environment recognition unit)".

The above-described various items of information obtained by the image-recognition_ECU 13 are output to the driving_ECU 14 as the driving environment information.

The driving_ECU 14 is a control unit that centrally controls the drive assist system 1.

Various sensors, such as a locator unit 20, a left-front side sensor 21lf, a right-front side sensor 21rf, a left-rear side sensor 21lr, and a right-rear side sensor 21rr, are coupled to the driving_ECU 14. Various control units, such as an engine control unit (E/G_ECU) 22, a transmission control unit (T/M_ECU) 23, a braking control unit (BK_ECU) 24, and a power steering control unit (PS_ECU) 25, are coupled to the driving_ECU 14 via an in-vehicle communication network, such as a controller area network (CAN).

The left-front side sensor 21lf and the right-front side sensor 21rf are constituted by millimeter radars, for example. The left-front side sensor 21lf and the right-front side sensor 21rf are respectively installed on the left and right sides of a front bumper of the vehicle O, for example. The left-front side sensor 21lf and the right-front side sensor 21rf detect objects in areas on the obliquely left-right front sides and the lateral sides as driving environment information, which are difficult to recognize by images captured by the stereo camera 11.

The left-rear side sensor 21lr and the right-rear side sensor 21rr are constituted by millimeter radars, for example. The left-rear side sensor 21lr and the right-rear side sensor 21rr are respectively installed on the left and right sides of a rear bumper of the vehicle O, for example. The left-rear side sensor 21lr and the right-rear side sensor 21rr detect objects in areas on the obliquely left-right rear sides and the rear side as driving environment information, which are difficult to recognize by the left-front side sensor 21lf and the right-front side sensor 21rf.

If the individual sensors 21 are constituted by millimeter radars, the millimeter radars analyze waves reflected by and returned from objects so as to detect objects, such as a vehicle driving along the vehicle O and a vehicle driving behind the vehicle O in the same direction. In one example, each millimeter radar detects, as information concerning an object, the lateral width, the positions of representative points (relative position of the object to the vehicle O), and velocity, for example.

In one embodiment, the left-front side sensor 21lf, right-front side sensor 21rf, left-rear side sensor 21lr, and right-rear side sensor 21rr may serve as an example of the "driving environment recognizer (driving environment recognition unit)" that recognizes driving environment information outside the vehicle O.

The locator unit 20 includes a global navigation satellite system (GNSS) sensor 20a and a high-definition roadmap database (roadmap DB) 20b.

The GNSS sensor 20a receives positioning signals emitted from multiple positioning satellites so as to measure the position (such as the latitude, longitude, and altitude) of the vehicle O.

The roadmap DB 20b is a large-capacity storage medium, such as a hard disk drive (HDD), and stores high-definition roadmap information (dynamic map). The roadmap information includes lane data used for autonomous driving. Examples of the lane data of a lane are the lane width, coordinates of the position of the lane center, azimuth angle in the traveling direction, and speed limit. The lane data is stored on a roadmap at intervals of several meters of each lane. The roadmap DB 20b also stores information, such as traffic light data, as supplementary data of the lane data.

In response to a request signal from the driving_ECU 14, for example, the roadmap DB 20b outputs roadmap information within a set range based on the position of the vehicle O measured by the GNSS sensor 20a to the driving_ECU 14 as the driving environment information.

In one embodiment, the locator unit 20 may serve as an example of the "driving environment recognizer (driving environment recognition unit)".

A throttle actuator 32 for an electronic control throttle, for example, is coupled to the output side of the E/G_ECU 22. Various sensors (not illustrated), such as an accelerator sensor, are coupled to the input side of the E/G_ECU 22.

The E/G_ECU 22 controls the driving of the throttle actuator 32, for example, based on a control signal from the driving_ECU 14 or detection signals from various sensors. With this control operation, the E/G_ECU 22 adjusts the air intake amount of an engine and causes the engine to generate a desired level of engine output. The E/G_ECU 22 also outputs signals indicating various values, such as the value of the accelerator position, detected by various sensors to the driving_ECU 14.

A fluid pressure control circuit 33 is coupled to the output side of the T/M_ECU 23. Various sensors (not illustrated), such as a transmission position sensor, are coupled to the input side of the T/M_ECU 23. The T/M_ECU 23 performs fluid pressure control for the fluid pressure control circuit 33, for example, based on an engine torque signal indicating an engine torque estimated by the E/G_ECU 22 and detection signals from various sensors. The T/M_ECU 23 drives certain elements, such as a friction element and a pulley, provided in an automatic transmission so as to transmit the engine output at a desired transmission gear ratio. The T/M_ECU 23 also outputs signals indicating various values, such as the value of a transmission position, detected by various sensors to the driving_ECU 14.

A brake actuator 34 is coupled to the output side of the BK_ECU 24. The brake actuator 34 adjusts the brake fluid pressure to be applied to a brake wheel cylinder provided in each wheel. Various sensors (not illustrated), such as a brake pedal sensor, a yaw rate sensor, a longitudinal acceleration sensor, and a vehicle velocity sensor, are coupled to the input side of the BK_ECU 24.

The BK_ECU 24 controls the driving of the brake actuator 34, for example, based on a control signal from the driving_ECU 14 or detection signals from various sensors. The BK_ECU 24 causes the brake actuator 34 to generate a suitable braking force in each wheel to perform forced braking control or yaw rate control for the vehicle O. The BK_ECU 24 outputs signals indicating various values, such as the values of the braking state, yaw rate, longitudinal acceleration, and velocity of the vehicle O, detected by various sensors to the driving_ECU 14.

An electric power steering motor 35 is coupled to the output side of the PS_ECU 25. The electric power steering motor 35 applies a steering torque to a steering mechanism by using a rotational force of the motor. Various sensors, such as a steering torque sensor and a steering angle sensor, are coupled to the input side of the PS_ECU 25.

The PS_ECU 25 controls the driving of the electric power steering motor 35, for example, based on a control signal from the driving_ECU 14 or detection signals from various sensors. The PS_ECU 25 causes the electric power steering motor 35 to generate a steering torque in the steering mechanism. The PS_ECU 25 also outputs signals indicating various values, such as the value of a steering torque and that of a steering angle, detected by various sensors to the driving_ECU 14.

In the driving_ECU 14, a manual driving mode and first and second driving control modes, for example, are set as driving modes. The first and second driving control modes are used for performing driving control. The driving_ECU 14 can selectively switch between these modes.

The manual driving mode is a mode performed with the intervention of a human driver. For example, in the manual driving mode, the driver manually drives the vehicle O by steering, accelerating, and braking.

The first driving control mode is also a mode performed with the intervention of a human driver. The first driving control mode is a semi-autonomous driving mode to cause the vehicle O to run while reflecting the driving operations of the driver. The first driving control mode is implemented as a result of the driving_ECU 14 outputting various control signals to the E/G_ECU 22, T/M_ECU 23, BK_ECU 24, and PS_ECU 25. In the first driving control mode, adaptive cruise control (ACC), active lane keep centering (ALKC) control, and active lane keep bouncing (ALKB) control, for example, are suitably combined and are performed.

ACC is performed basically based on the driving environment information input from the image-recognition_ECU 13. Basically, ACC is performed as a result of the driving_ECU 14 selectively executing cruising control and steady driving control.

For example, if a vehicle driving ahead of the vehicle O is registered as a leading vehicle L based on the driving environment information, the driving_ECU 14 performs cruising control as part of ACC. In this cruising control, the driving_ECU 14 sets a target vehicle-to-vehicle distance based on the velocity of the leading vehicle L, for example. The driving_ECU 14 then performs accelerate/decelerate control to maintain the target vehicle-to-vehicle distance.

If a leading vehicle L driving ahead of the vehicle O is not registered, the driving_ECU 14 performs steady driving control as part of ACC. In this steady driving control, the driving_ECU 14 performs accelerate/decelerate control for the vehicle O by using a set velocity Vset input by the human driver as a target velocity. The driving_ECU 14 maintains the velocity of the vehicle O at the set velocity Vset.

ALKC control and ALKB control are performed basically based on at least one of the driving environment information input from the image-recognition_ECU 13 and that from the locator unit 20. That is, the driving_ECU 14 sets a target traveling route along the left and right marking lines at the center of the lane of the vehicle O, based on lane marking line information included in the driving environment information, for example. The driving_ECU 14 then performs certain steering control, such as feedforward control and feedback control, based on the target traveling route so as to maintain the vehicle O at the center of the lane.

The second driving control mode is a mode for driving the vehicle O without the intervention of a human driver performing steering, accelerating, and braking operations. That is, the second driving control mode is an autonomous driving mode for autonomously driving the vehicle O without the intervention of a human driver. The second driving control mode is implemented as a result of the driving_ECU 14 outputting various control signals to the E/G_ECU 22, BK_ECU 24, and PS_ECU 25, for example. In the second driving control mode, control operations, such as ACC, ALKC control, and ALKB control, for example, are suitably combined with each other and are performed. Additionally, to drive the vehicle O in accordance with a target route (route map information), auto lane changing (ALC) control is suitably performed in the second driving control mode.

Basically, ALC control is performed based on at least one of the driving environment information input from the image-recognition_ECU 13 and that from the locator unit 20. That is, the driving_ECU 14 sets a target lateral position within a lane adjacent to the driving lane of the vehicle O, based on information included in the driving environment information, for example. The driving_ECU 14 then sets a target path from the target route of the vehicle O to the target lateral position. The driving_ECU 14 then performs steering control along the target path on condition that no vehicle driving along the vehicle O and no vehicle driving behind the vehicle O are detected in the adjacent lane by the sensors 211*f*, 21*rf*, 211*r*, and 21*rr*.

An example of ACC performed in the embodiment will now be discussed below.

Figure 2:
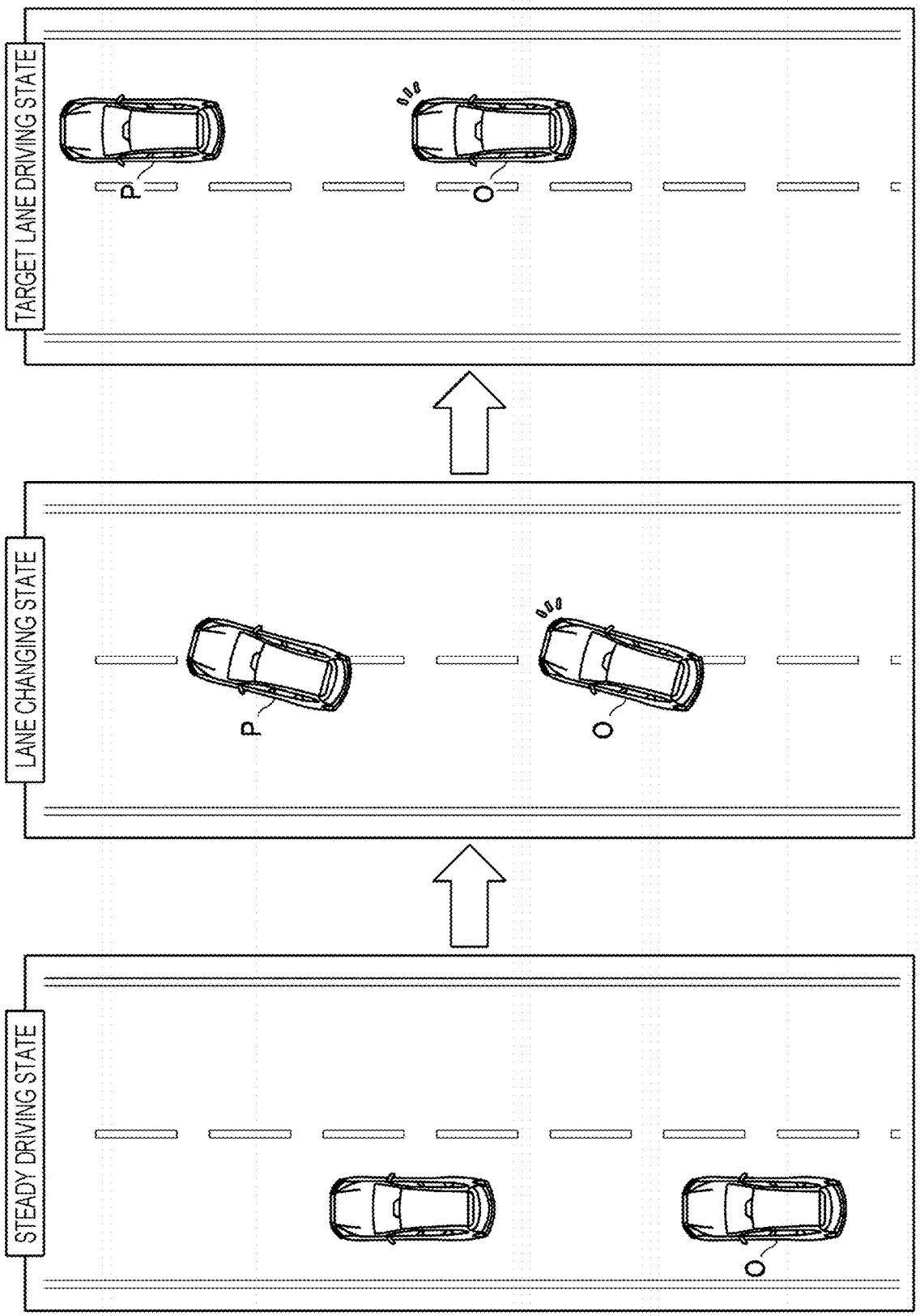
FIG. 2 is a schematic view for describing the transition of the driving state of a vehicle and that of a front vehicle.

In ACC, the driving_ECU 14 determines the driving state of the vehicle O. Basically, the driving_ECU 14 classifies the driving state of the vehicle O as one of a steady driving state, a lane changing state, and a target lane driving state (see FIG. 2). The driving state of the vehicle O is determined based on certain information, such as information on the movement of the vehicle O in a lateral direction and information on the relative position of the vehicle O to a lane marking line.

Figure 3:
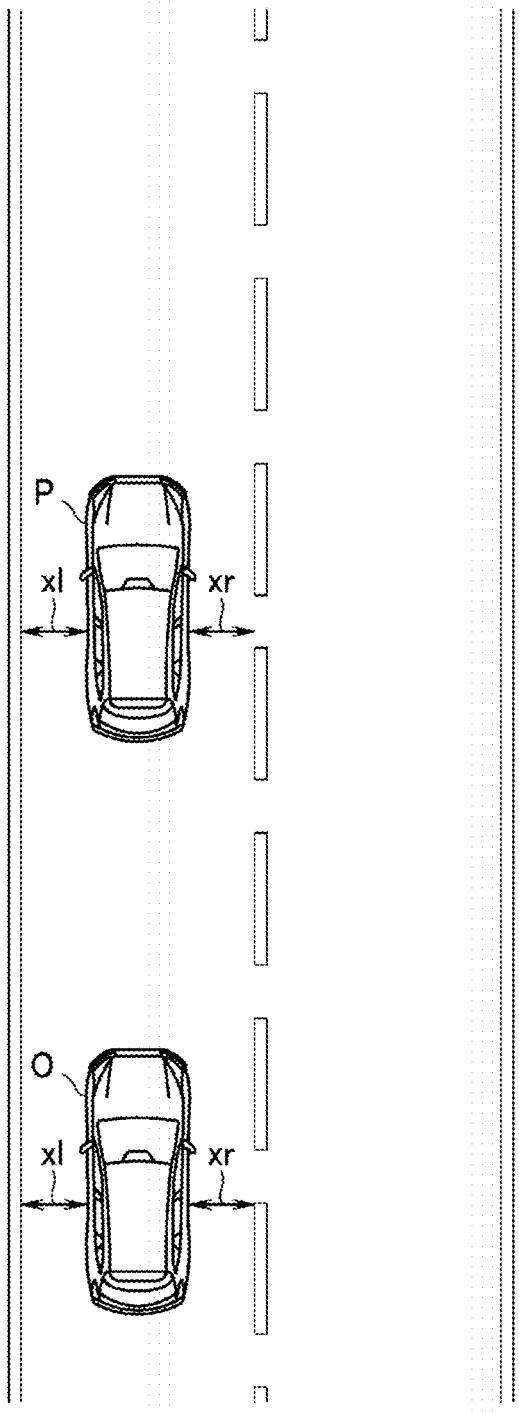
FIG. 3 is a schematic view for describing a condition for determining whether a vehicle and a front vehicle are in a steady driving state.

The steady driving state is a state in which the vehicle O is driving steadily in a current lane. For example, if a state in which the vehicle O is driving without moving in a lateral direction has continued for a preset time (one second, for example) or longer, the driving_ECU 14 determines that the vehicle O is in the steady driving state. To make this determination, the driving_ECU 14 calculates a lateral movement amount $\Delta x$ of the vehicle O based on the distance xl from the vehicle O to the left side lane marking line and the distance xr of the vehicle O to the right side lane marking line (see FIG. 3). If a state in which the lateral movement amount $\Delta x$ is smaller than a predetermined threshold has continued for the preset time or longer, the driving_ECU 14 determines that the vehicle O is in the steady driving state.

Figure 4:
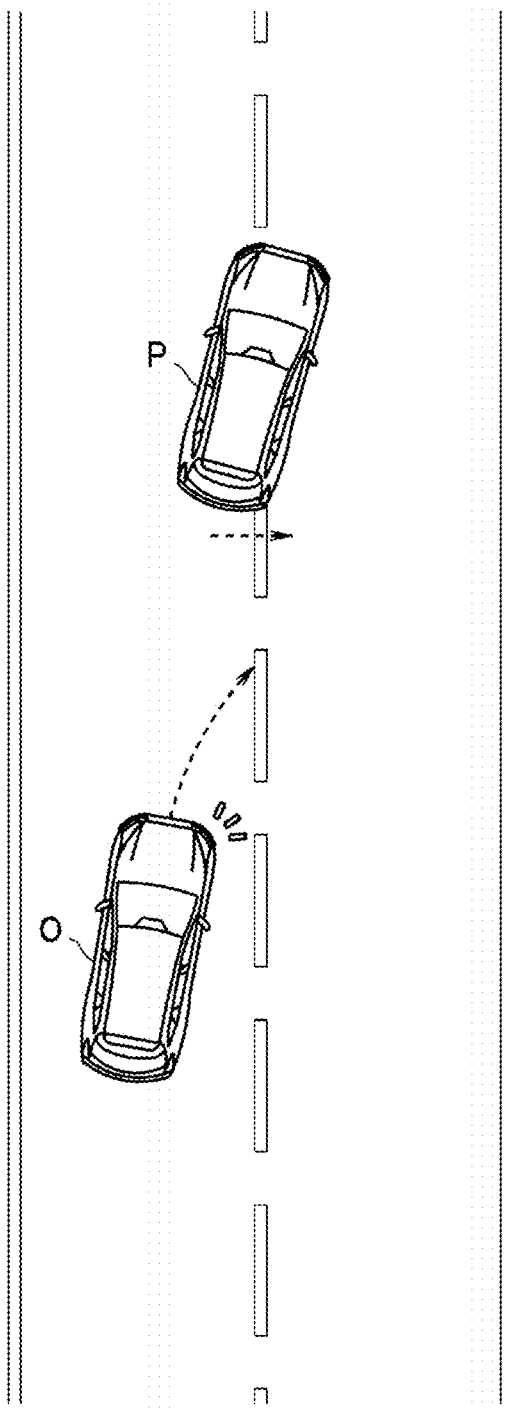
FIG. 4 is a schematic view for describing a condition for determining whether a vehicle and a front vehicle are in a lane changing state.

The lane changing state is a transition state in which the vehicle O is changing from a current lane (lane in which the vehicle O is driving in the steady driving state) to an adjacent target lane. For example, as illustrated in FIG. 4, if a direction indicator of the vehicle O is ON, the driving_ECU 14 indirectly determines that the vehicle O is moving toward a lane marking line in the lateral direction. The driving_ECU 14 then determines that the vehicle O is in the lane changing state. Alternatively, for example, if an estimated traveling route of the vehicle O crosses the lane marking line near the vehicle O as illustrated in FIG. 4, the driving_ECU 14 determines that the vehicle O is in the lane changing state. The estimated traveling route of the vehicle O can be calculated based on the steering angle of the vehicle O, for example. If, however, ALC control is being executed for the vehicle O, the target traveling route set in ALC control is used as the estimated traveling route.

Figure 5:
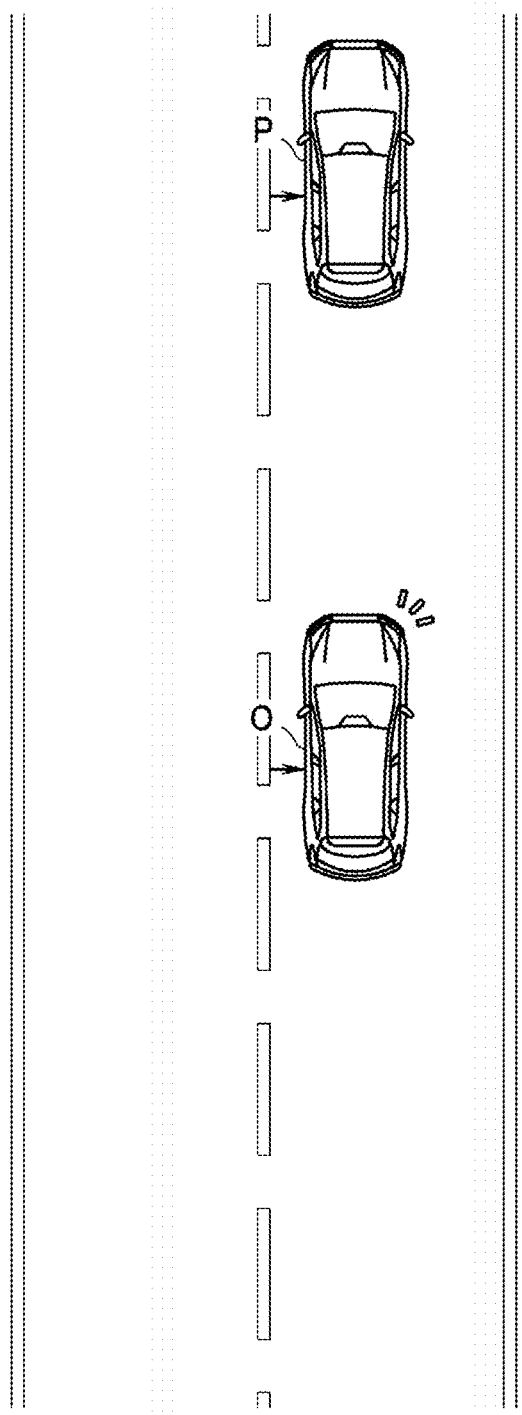
FIG. 5 is a schematic view for describing a condition for determining whether a vehicle and a front vehicle are in a target lane driving state.

The target lane driving state is a state in which the vehicle O is driving in a target lane. For example, as illustrated in FIG. 5, if a state in which the entirety of the vehicle O has entered a target lane because of a lane change has continued for a preset number (five, for example) of frames or greater, the driving_ECU 14 determines that the vehicle O is in the target lane driving state. If the vehicle O in the target lane driving state satisfies the above-described condition for determining that the vehicle O is in the steady driving state, the driving_ECU 14 sets the target lane to be an updated driving lane of the vehicle O and determines that the vehicle O has shifted to the steady driving state.

The driving_ECU 14 extracts a front vehicle P driving in front of the vehicle O, based on the driving environment information. In the embodiment, the front vehicle P is a vehicle moving in the substantially same direction as the vehicle O. The concept of the front vehicle P covers a leading vehicle L, which will be discussed later.

If a front vehicle P is extracted, the driving_ECU 14 determines the driving state of the front vehicle P. For example, basically, the driving_ECU 14 classifies the driving state of the front vehicle P as one of the steady driving state, the lane changing state, and the target lane driving state (see FIG. 2). The driving state of the front vehicle P is determined based on certain information, such as information on the movement of the front vehicle P in a lateral direction and information on the relative position of the front vehicle P to a lane marking line.

The steady driving state is a state in which the front vehicle P is driving steadily in a current lane. The driving_ECU 14 determines whether the front vehicle P is in the steady driving state, based on a condition similar to that for the vehicle O, for example.

The lane changing state is a transition state in which the front vehicle P is changing from a current lane (lane in which the front vehicle P is driving in the steady driving state) to an adjacent target lane. For example, as illustrated in FIG. 4, if the front vehicle P is continuously moving in the lateral direction for a preset number (five, for example) frames or greater, the driving_ECU 14 determines that the front vehicle P is in the lane changing state. Alternatively, for example, if the center of the front vehicle P has exceeded the lane marking line as illustrated in FIG. 4, the driving_ECU 14 determines that the front vehicle P is in the lane changing state.

The target lane driving state is a state in which the front vehicle P is driving in a target lane. The driving_ECU 14 determines whether the front vehicle P is in the target lane driving state, based on a condition similar to that for the vehicle O, for example.

If a front vehicle P is extracted, the driving_ECU 14 determines whether to register the front vehicle P as a leading vehicle L. This determination is made based on the relationships between the vehicle O and the front vehicle P represented by the following conditions (1), (2), and (3).
 (1) The vehicle-to-vehicle distance Dv between the vehicle O and the front vehicle P (see FIG. 6, for example) is smaller than or equal to a preset threshold Dvth.
 (2) The velocity Vp of the front vehicle P is lower than or equal to the set velocity Vset of the vehicle O used in steady driving control.
 (3) The vehicle O and the front vehicle P are driving steadily in the same lane.

Basically, if all the conditions (1) through (3) are satisfied, the driving_ECU 14 uses such relationships between the vehicle O and the front vehicle P as a leading vehicle register condition and registers the front vehicle P as a leading vehicle L.

After the front vehicle P is registered as a leading vehicle L, if at least one of the conditions (1) through (3) is no longer satisfied, the driving_ECU 14 uses such relationships between the vehicle O and the front vehicle P as a leading vehicle deregister condition and deregisters the leading vehicle L.

After a leading vehicle L is registered, the driving_ECU 14 performs cruising control.

In cruising control, the driving_ECU 14 calculates a target acceleration a1 for causing the velocity Vo of the vehicle O to approximate to the set velocity Vset. To calculate the target acceleration a1, the driving_ECU 14 calculates a difference Vrel (=Vset−Vo) between the velocity Vo of the vehicle O and the set velocity Vset. The driving_ECU 14 then calculates the target acceleration a1 in accordance with the difference Vrel by referring to a preset map, for example.

In cruising control, the driving_ECU 14 also calculates a target acceleration a2 for causing the vehicle-to-vehicle distance Dv between the vehicle O and the leading vehicle L to approximate to a target vehicle-to-vehicle distance Dtrg. To calculate the target acceleration a2, the driving_ECU 14 calculates the target vehicle-to-vehicle distance Dtrg in accordance with the velocity Vo of the vehicle O by referring to a preset map, for example. The driving_ECU 14 also calculates a difference ΔD (=Dtrg−Dv) between the target vehicle-to-vehicle distance Dtrg and the vehicle-to-vehicle distance Dv. The driving_ECU 14 also calculates a relative velocity Vrel of the velocity Vl of the leading vehicle L to the velocity Vo of the vehicle O. The driving_ECU 14 then calculates the target acceleration a2 in accordance with the difference ΔD and the relative velocity Vrel by referring to a preset map, for example.

After calculating the target accelerations a1 and a2, the driving_ECU 14 performs accelerate/decelerate control for the vehicle O by using a greater one of the values of the target accelerations a1 and a2.

If the registration of the leading vehicle L is canceled, the driving_ECU 14 performs steady driving control.

In the steady driving control, the driving_ECU 14 calculates the target acceleration a1 similarly to that in the above-described cruising control. The driving_ECU 14 then performs accelerate/decelerate control for the vehicle O by using the target acceleration a1.

If the registration of the leading vehicle L is canceled as a result of the vehicle O having changed lanes, the driving_ECU 14 performs lane-change accelerate control until the velocity Vo of the vehicle O reaches the set velocity Vset. In lane-change accelerate control, the driving_ECU 14 calculates an adjusted target acceleration a1', which is an increased value of the target acceleration a1 calculated in the steady driving control. For example, the driving_ECU 14 multiplies the target acceleration a1 by a predetermined gain so as to calculate the adjusted target acceleration a1'. Alternatively, for example, the driving_ECU 14 adds a predetermined acceleration value to the target acceleration a1 so as to calculate the adjusted target acceleration a1'. By setting the adjusted target acceleration a1', the driving_ECU 14 can smoothly accelerate the vehicle O in a certain situation, such as when the vehicle O passes the leading vehicle L after a lane change.

At the time of a lane change, it may temporarily become unclear in which lane the vehicle O and the leading vehicle L are driving. If the vehicle O and the leading vehicle L (front vehicle P) change lanes within a predetermined time substantially in synchronization with each other (such a lane change will be called a synchro lane change), the leading vehicle L is deregistered and is registered again in a short period of time. If lane-change accelerate control is temporarily performed due to the switching of the registration status of the leading vehicle L, unwanted acceleration/ deceleration may occur in the vehicle O. To prevent the switching of the registration status of the leading vehicle L at the time of a synchro lane change, the driving_ECU 14 changes part of the register condition and part of the deregister condition for the leading vehicle L.

In one example, the driving_ECU 14 starts to monitor a front vehicle P, basically on condition that the front vehicle P is registered as a leading vehicle L and the steady driving state of the vehicle O and the front vehicle P is maintained for a preset time (one second, for example). In this monitoring, the driving_ECU 14 monitors whether the front vehicle P performs a synchro lane change to the same target lane as the vehicle O. In the embodiment, the driving_ECU 14 sets a monitor flag Fslc to "1" while monitoring a front vehicle P.

Basically, the monitoring of the front vehicle P is canceled when the vehicle O and the front vehicle P have shifted to a state in which they are driving in the same target lane (target lane driving state). If at least one of preset canceling conditions for the vehicle O and that for the front vehicle P is satisfied, the monitoring of the front vehicle P is also canceled. The canceling conditions are set for each of the vehicle O and the front vehicle P in accordance with their driving states.

Then, the driving_ECU 14 relaxes the leading vehicle register condition when the front vehicle P is being monitored, compared with when the front vehicle P is not being monitored.

For example, even when the above-described condition (3) is not satisfied, if the above-described conditions (1) and (2) are satisfied, the driving_ECU 14 registers the front vehicle P as a leading vehicle L as an unexceptional case.

That is, while the front vehicle P is being monitored and also when it is not registered as a leading vehicle L, the driving_ECU 14 registers the front vehicle P as a leading vehicle L on condition that, when the vehicle O has started to change lanes, the front vehicle P is also changing to the same target lane as the vehicle O to a certain degree. This situation corresponds to a situation where the vehicle O and the front vehicle P are performing a synchro lane change. "The front vehicle P is changing to the same target lane as the vehicle O to a certain degree" refers to, for example, that the front vehicle P has entered the target lane by a predetermined amount (350 [mm], for example) or greater.

The driving_ECU 14 relaxes the leading vehicle deregister condition when the front vehicle P is being monitored, compared with when the front vehicle P is not being monitored.

For example, even when the above-described condition (3) is not satisfied, if the above-described conditions (1) and (2) are satisfied, the driving_ECU 14 maintains the registration of the front vehicle P as a leading vehicle L in a predetermined manner as an unexceptional case.

That is, while the front vehicle P is being monitored and also when it is registered as a leading vehicle L, even when the vehicle O has started to change lanes, the driving_ECU 14 does not cancel the registration of the front vehicle P until a set time T1 (five seconds, for example) elapses. Then, if the front vehicle P starts to change lanes before the set time T1 elapses, the driving_ECU 14 maintains the registration of the front vehicle P as a leading vehicle L. This situation corresponds to a situation where the vehicle O and the front vehicle P are performing a synchro lane change. In contrast, if the front vehicle P does not start to change lanes before the set time T1 elapses, the driving_ECU 14 cancels the registration of the front vehicle P as a leading vehicle L.

While the front vehicle P is being monitored and also when it is registered as a leading vehicle L, even when the front vehicle P has started to change lanes, the driving_ECU 14 does not cancel the registration of the front vehicle P until a set time T2 (two seconds, for example) elapses. Then, if the vehicle O starts to change lanes before the set time T2 elapses, the driving_ECU 14 maintains the registration of the front vehicle P as a leading vehicle L. This situation corresponds to a situation where the vehicle O and the front vehicle P are performing a synchro lane change. In contrast, if the vehicle O does not start to change lanes before the set time T2 elapses, the driving_ECU 14 cancels the registration of the front vehicle P as a leading vehicle L.

As described above, in one embodiment, the driving_ECU 14 may serve as an example of a "front vehicle extractor", a "leading-vehicle registration determiner", a "first driving state classifier", a "second driving state classifier", a "front vehicle monitor", a "synchro lane change determiner", and an "adaptive cruise controller".

Figure 9:
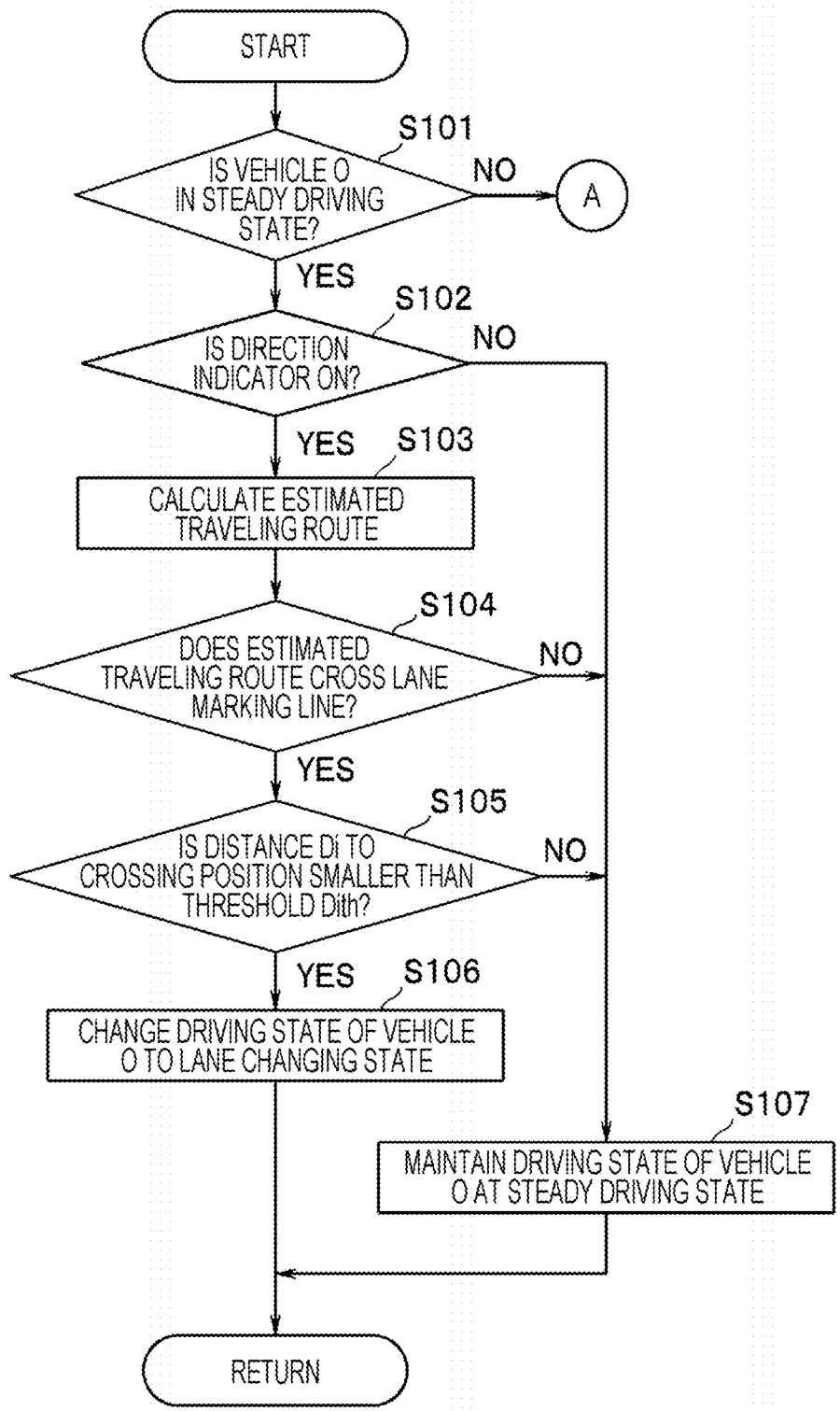
FIGS. 9 through 11 are a flowchart illustrating a routine for determining the driving state of a vehicle using a drive assist system.
Figure 10:
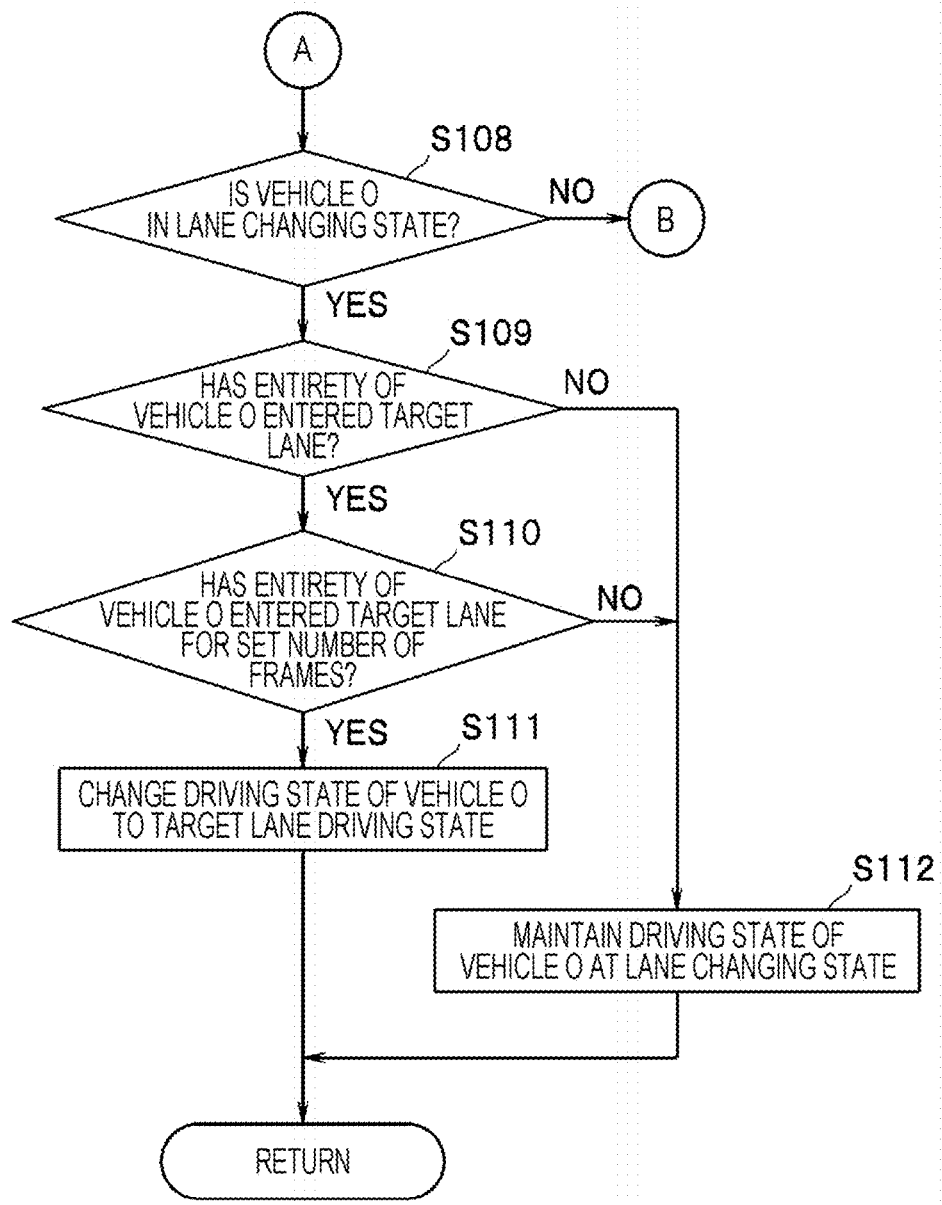
Figure 11:
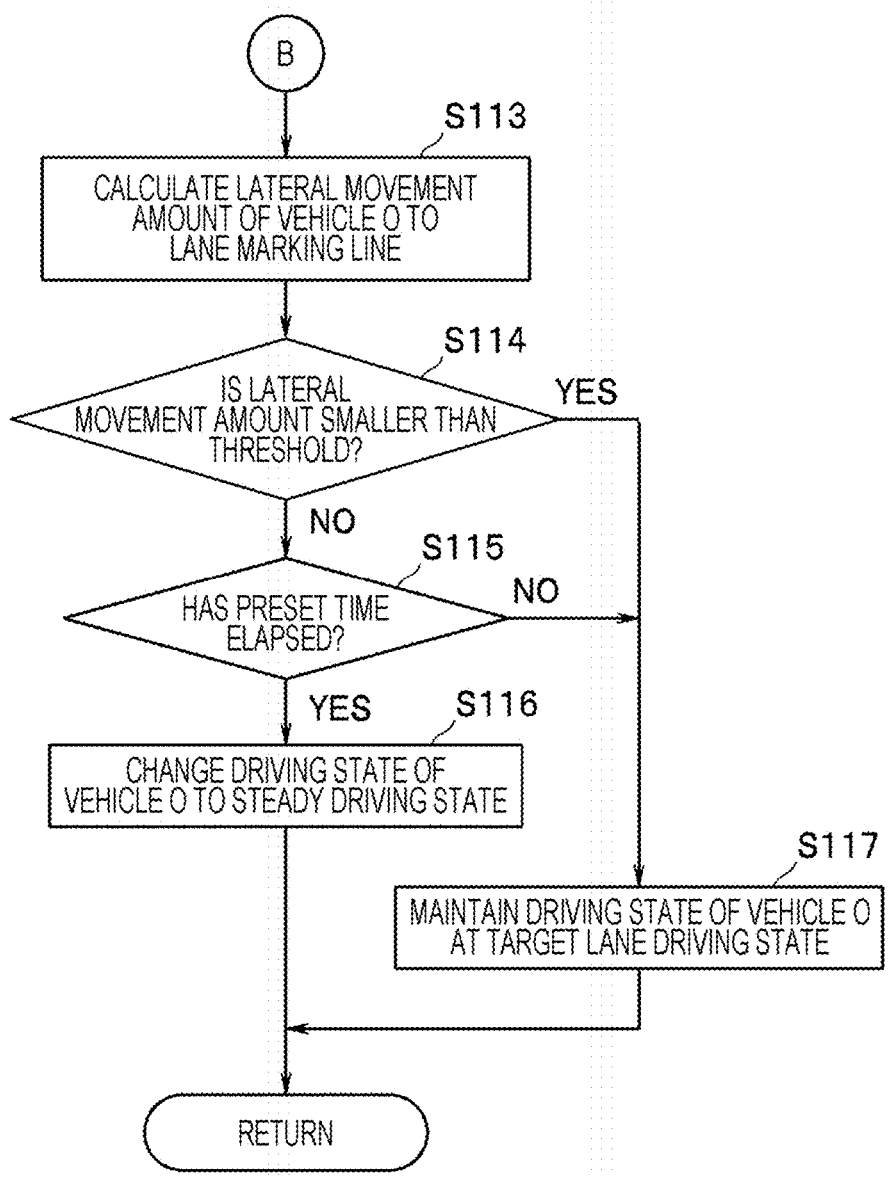

Processing for determining the driving state of the vehicle O will now be described below with reference to the flowchart of a driving state determining routine illustrated in FIGS. 9 through 11. This routine is repeatedly executed by the driving_ECU 14 at regular set time intervals.

After the routine starts, in step S101, the driving_ECU 14 checks whether the current driving state of the vehicle O is the steady driving state.

If it is determined in step S101 that the driving state of the vehicle O is not the steady driving state (NO in step S101), the driving_ECU 14 proceeds to step S108.

If it is determined in step S101 that the driving state of the vehicle O is the steady driving state (YES in step S101), the driving_ECU 14 proceeds to step S102.

In step S102, the driving_ECU 14 checks whether the direction indicator of the vehicle O is ON.

If it is determined in step S102 that the direction indicator is not ON (NO in step S102), the driving_ECU 14 proceeds to step S107.

If it is determined in step S102 that the direction indicator is ON (YES in step S102), the driving_ECU 14 proceeds to step S103.

In step S103, the driving_ECU 14 calculates an estimated traveling route of the vehicle O. If, for example, the manual driving mode or the first driving control mode is selected as the driving mode of the vehicle O, the driving_ECU 14 calculates the estimated traveling route of the vehicle O based on the steering angle of the vehicle O. If, for example, the second driving control mode is selected as the driving mode of the vehicle O, the driving_ECU 14 uses a target traveling route which is calculated for steering control of the vehicle O as the estimated traveling route.

In step S104, the driving_ECU 14 checks whether the estimated traveling route crosses a lane marking line.

If it is determined in step S104 that the estimated traveling route does not cross a lane marking line (NO in step S104), the driving_ECU 14 proceeds to step S107.

If it is determined in step S104 that the estimated traveling route crosses a lane marking line (YES in step S104), the driving_ECU 14 proceeds to step S105.

In step S105, the driving_ECU 14 checks whether the distance Di from the vehicle O to the crossing position of the estimated traveling route of the vehicle O and the lane marking line is smaller than a preset threshold Dith.

If it is determined in step S105 that the distance Di is smaller than the threshold Dith (YES in step S105), the driving_ECU 14 proceeds to step S106.

Then, the driving_ECU 14 determines in step S106 that the driving state of the vehicle O has shifted from the steady driving state to the lane changing state and then exits from the routine.

If it is determined in step S105 that the distance Di is larger than or equal to the threshold Dith (NO in step S105), the driving_ECU 14 proceeds to step S107.

After the driving_ECU 14 proceeds from step S102, S104, or S105 to step S107, it exits from the routine by maintaining the driving state of the vehicle O at the steady driving state.

After the driving_ECU 14 proceeds from step S101 to step S108, it checks whether the current driving state of the vehicle O is the lane changing state.

If it is determined in step S108 that the driving state of the vehicle O is not the lane changing state (NO in step S108), the driving_ECU 14 proceeds to step S113.

If it is determined in step S108 that the driving state of the vehicle O is the lane changing state (YES in step S108), the driving_ECU 14 proceeds to step S109.

In step S109, the driving_ECU 14 checks whether the entirety of the vehicle O has entered a target lane because of a lane change.

If it is determined in step S109 that the entirety of the vehicle O has not entered the target lane (NO in step S109), the driving_ECU 14 proceeds to step S112.

If it is determined in step S109 that the entirety of the vehicle O has entered the target lane (YES in step S109), the driving_ECU 14 proceeds to step S110.

In step S110, the driving_ECU 14 checks whether a state in which the entirety of the vehicle O has entered the target lane has continued for a preset number (five, for example) of frames or greater.

If it is determined in step S110 that the state in which the entirety of the vehicle O has entered the target lane has continued for the preset number of frames or greater (YES in step S110), the driving_ECU 14 proceeds to step S111.

In step S111, the driving_ECU 14 determines that the driving state of the vehicle O has shifted from the lane changing state to the target lane driving state and then exits from the routine.

If it is determined in step S110 that the state in which the entirety of the vehicle O has entered the target lane has not continued for the preset number of frames or greater (NO in step S110), the driving_ECU 14 proceeds to step S112.

After the driving_ECU 14 proceeds from step S109 or S110 to step S112, it exits from the routine by maintaining the driving state of the vehicle O at the lane changing state.

After the driving_ECU 14 proceeds from step S108 to step S113, it calculates a lateral movement amount Δx of the vehicle O with respect to the lane marking line.

In step S114, the driving_ECU 14 checks whether the calculated lateral movement amount Δx is smaller than a threshold.

If it is determined in step S114 that the lateral movement amount Δx is smaller than the threshold (YES in step S114), the driving_ECU 14 proceeds to step S117.

If it is determined in step S114 that the lateral movement amount Δx is greater than or equal to the threshold (NO in step S114), the driving_ECU 14 proceeds to step S115.

In step S115, the driving_ECU 14 checks whether a state in which the lateral movement amount Δx is greater than or equal to the threshold has continued for a preset time (one second, for example) or longer.

If it is determined in step S115 that the state in which the lateral movement amount Δx is greater than or equal to the threshold has continued for the preset time or longer (YES in step S115), the driving_ECU 14 proceeds to step S116.

In step S116, the driving_ECU 14 determines that the driving state of the vehicle O has shifted from the target lane driving state to the steady driving state and then exits from the routine.

If it is determined in step S115 that the state in which the lateral movement amount Δx is greater than or equal to the threshold has not continued for the preset time or longer (NO in step S115), the driving_ECU 14 proceeds to step S117.

After the driving_ECU 14 proceeds from step S114 or S115 to step S117, it exits from the routine by maintaining the driving state of the vehicle O at the target lane driving state.

Figure 12:
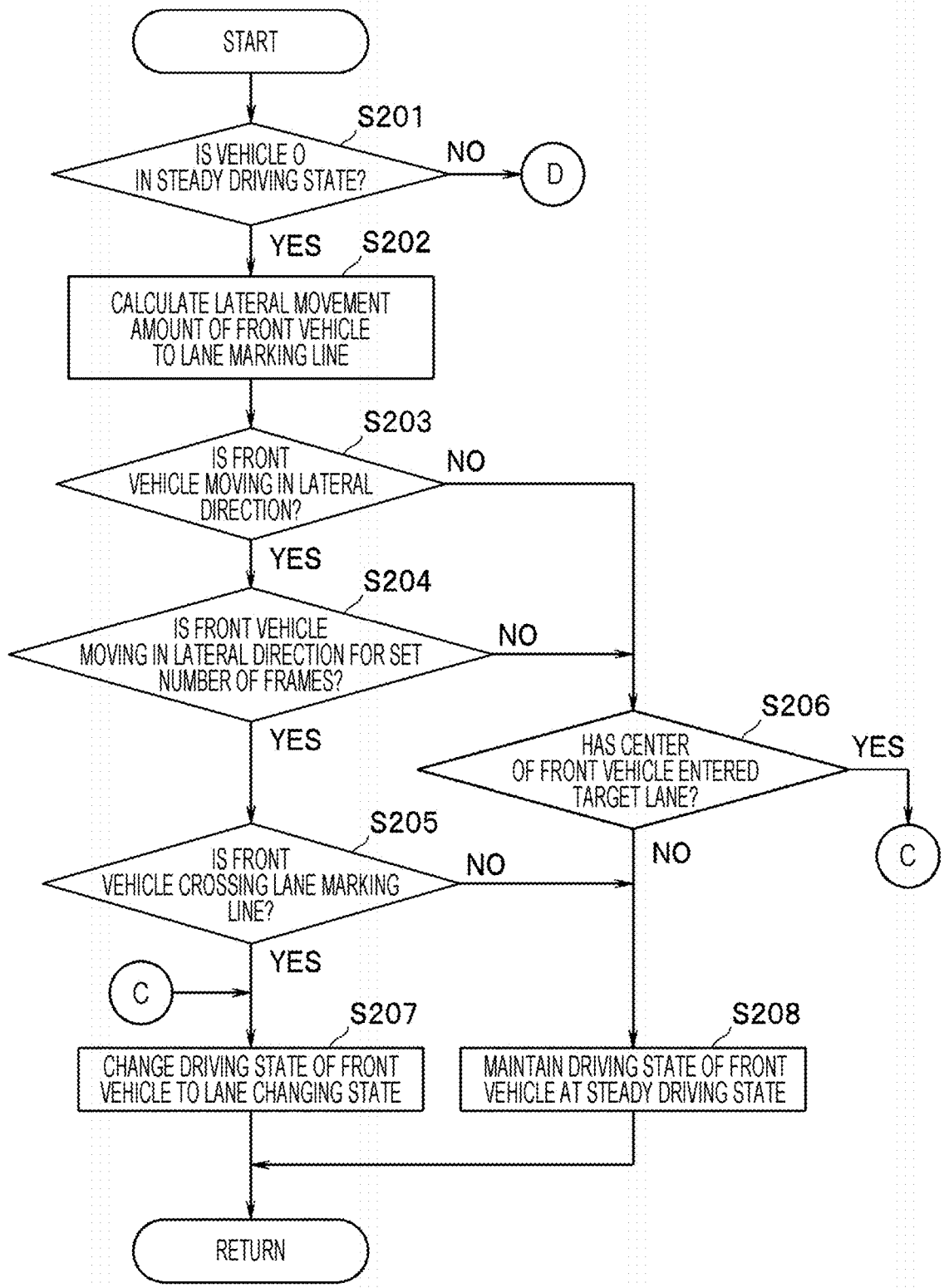
FIGS. 12 through 14 are a flowchart illustrating a routine for determining the driving state of a front vehicle.
Figure 13:
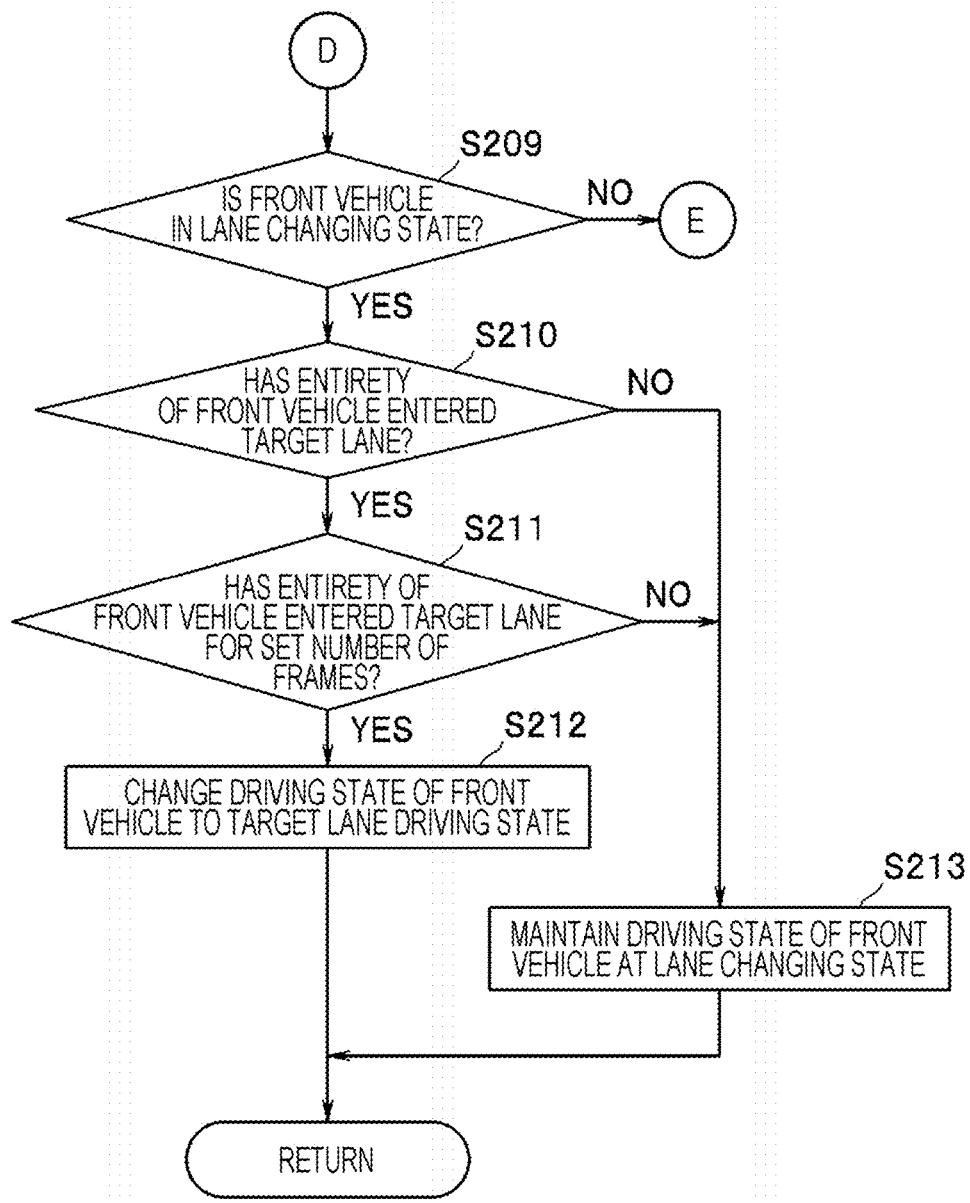
Figure 14:
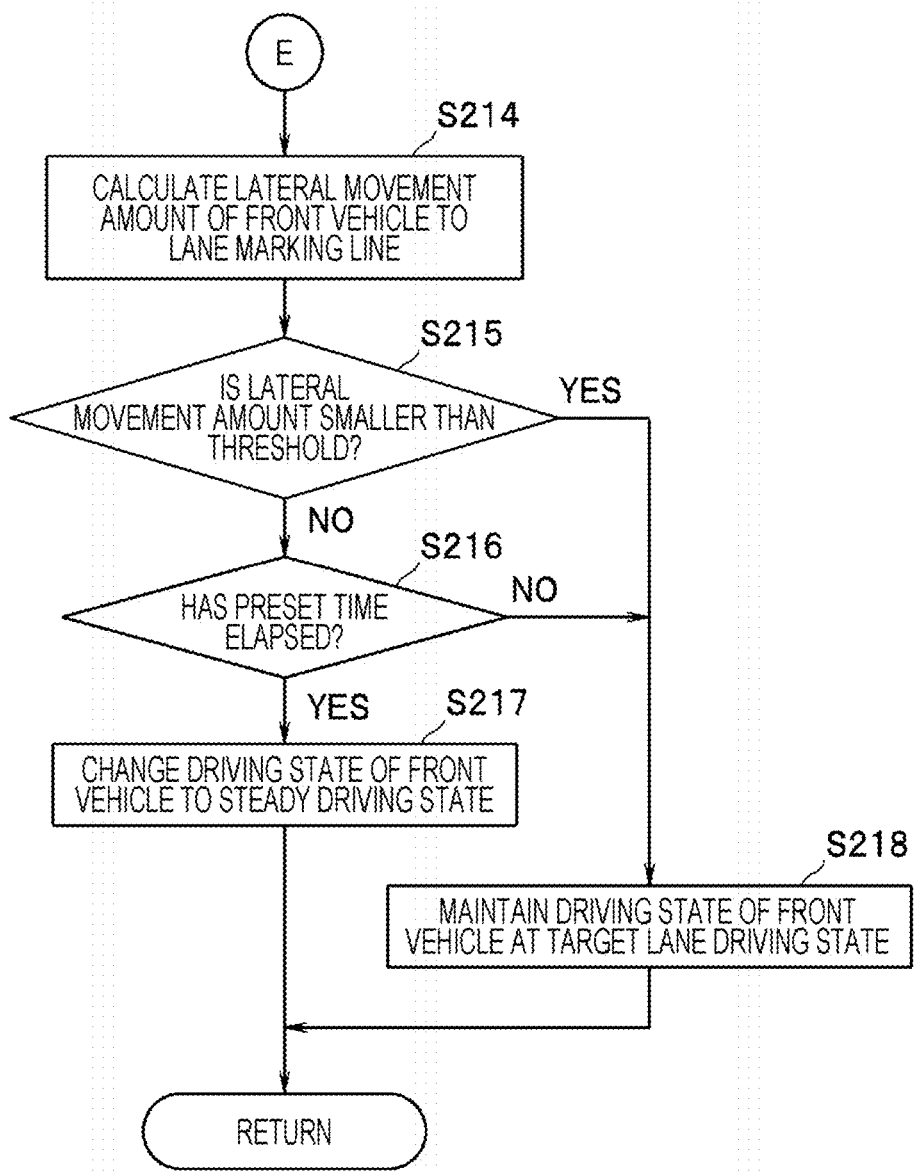

Processing for determining the driving state of a front vehicle P will now be described below with reference to the flowchart of a driving state determining routine illustrated in FIGS. 12 through 14. This routine is repeatedly executed by the driving_ECU 14 at regular set time intervals when a front vehicle P is being detected in front of the vehicle O.

After the routine starts, in step S201, the driving_ECU 14 checks whether the current driving state of the front vehicle P is the steady driving state.

If it is determined in step S201 that the driving state of the front vehicle P is not the steady driving state (NO in step S201), the driving_ECU 14 proceeds to step S209.

If it is determined in step S201 that the driving state of the front vehicle P is the steady driving state (YES in step S201), the driving_ECU 14 proceeds to step S202.

In step S202, the driving_ECU 14 calculates a lateral movement amount Δx of the front vehicle P with respect to a lane marking line.

In step S203, the driving_ECU 14 checks whether the front vehicle P is moving in a lateral direction. If the lateral movement amount Δx of the front vehicle P is greater than or equal to a preset threshold, for example, the driving_ECU 14 determines that the front vehicle P is moving in a lateral direction.

If it is determined in step S203 that the front vehicle P is not moving in a lateral direction (NO in step S203), the driving_ECU 14 proceeds to step S206.

If it is determined in step S203 that the front vehicle P is moving in a lateral direction (YES in step S203), the driving_ECU 14 proceeds to step S204.

In step S204, the driving_ECU 14 checks whether the lateral movement state of the front vehicle P has continued for a preset number (five, for example) of frames or greater.

If it is determined in step S204 that the lateral movement state of the front vehicle P has not continued for the preset number of frames or greater (NO in step S204), the driving_ECU 14 proceeds to step S206.

If it is determined in step S204 that the lateral movement state of the front vehicle P has continued for the preset number of frames or greater (YES in step S204), the driving_ECU 14 proceeds to step S205.

In step S205, the driving_ECU 14 checks whether the front vehicle P is crossing the lane marking line.

If it is determined in step S205 that the front vehicle P is crossing the lane marking line (YES in step S205), the driving_ECU 14 proceeds to step S207.

If it is determined in step S205 that the front vehicle P is not crossing the lane marking line (NO in step S205), the driving_ECU 14 proceeds to step S208.

After the driving_ECU 14 proceeds from step S203 or S204 to step S206, it checks whether the center of the front vehicle P has entered a target lane.

If it is determined in step S206 that the center of the front vehicle P has not entered the target lane (NO in step S206), the driving_ECU 14 proceeds to step S208.

If it is determined in step S206 that the center of the front vehicle P has entered the target lane (YES in step S206), the driving_ECU 14 proceeds to step S207.

After the driving_ECU 14 proceeds from step S205 or S206 to step S207, it determines in step S207 that the driving state of the front vehicle P has shifted from the steady driving state to the lane changing state and then exits from the routine.

After the driving_ECU 14 proceeds from S205 or S206 to step S208, it exits from the routine by maintaining the driving state of the front vehicle P at the steady driving state.

After the driving_ECU 14 proceeds from step S201 to step S209, it checks whether the current driving state of the front vehicle P is the lane changing state.

If it is determined in step S209 that the driving state of the front vehicle P is not the lane changing state (NO in step S209), the driving_ECU 14 proceeds to step S214.

If it is determined in step S209 that the driving state of the front vehicle P is the lane changing state (YES in step S209), the driving_ECU 14 proceeds to step S210.

In step S210, the driving_ECU 14 checks whether the entirety of the front vehicle P has entered a target lane because of a lane change.

If it is determined in step S210 that the entirety of the front vehicle P has not entered the target lane (NO in step S210), the driving_ECU 14 proceeds to step S213.

If it is determined in step S210 that the entirety of the front vehicle P has entered the target lane (YES in step S210), the driving_ECU 14 proceeds to step S211.

In step S211, the driving_ECU 14 checks whether a state in which the entirety of the front vehicle P has entered the target lane has continued for a preset number (five, for example) of frames or greater.

If it is determined in step S211 that the state in which the entirety of the front vehicle P has entered the target lane has continued for the preset number of frames or greater (YES in step S211), the driving_ECU 14 proceeds to step S212.

In step S212, the driving_ECU 14 determines that the driving state of the front vehicle P has shifted from the lane changing state to the target lane driving state and then exits from the routine.

If it is determined in step S211 that the state in which the entirety of the front vehicle P has entered the target lane has not continued for the preset number of frames or greater (NO in step S211), the driving_ECU 14 proceeds to step S213.

After the driving_ECU 14 proceeds from step S210 or S211 to step S213, it exits from the routine by maintaining the driving state of the front vehicle P at the lane changing state.

After the driving_ECU 14 proceeds from step S209 to step S214, it calculates the lateral movement amount Δx of the front vehicle P with respect to the lane marking line.

In step S215, the driving_ECU 14 checks whether the calculated lateral movement amount Δx is smaller than a threshold.

If it is determined in step S215 that the lateral movement amount Δx is smaller than the threshold (YES in step S215), the driving_ECU 14 proceeds to step S218.

If it is determined in step S215 that the lateral movement amount Δx is greater than or equal to the threshold (NO in step S215), the driving_ECU 14 proceeds to step S216.

In step S216, the driving_ECU 14 checks whether a state in which the lateral movement amount Δx is greater than or equal to the threshold has continued for a preset time (one second, for example) or longer.

If it is determined in step S216 that the state in which the lateral movement amount Δx is greater than or equal to the threshold has continued for the preset time or longer (YES in step S216), the driving_ECU 14 proceeds to step S217.

In step S217, the driving_ECU 14 determines that the driving state of the front vehicle P has shifted from the target lane driving state to the steady driving state and then exits from the routine.

If it is determined in step S216 that the state in which the lateral movement amount Δx is greater than or equal to the threshold has not continued for the preset time or longer (NO in step S216), the driving_ECU 14 proceeds to step S218.

After the driving_ECU 14 proceeds from step S215 or S216 to step S218, it exits from the routine by maintaining the driving state of the vehicle O at the target lane driving state.

Figure 15:
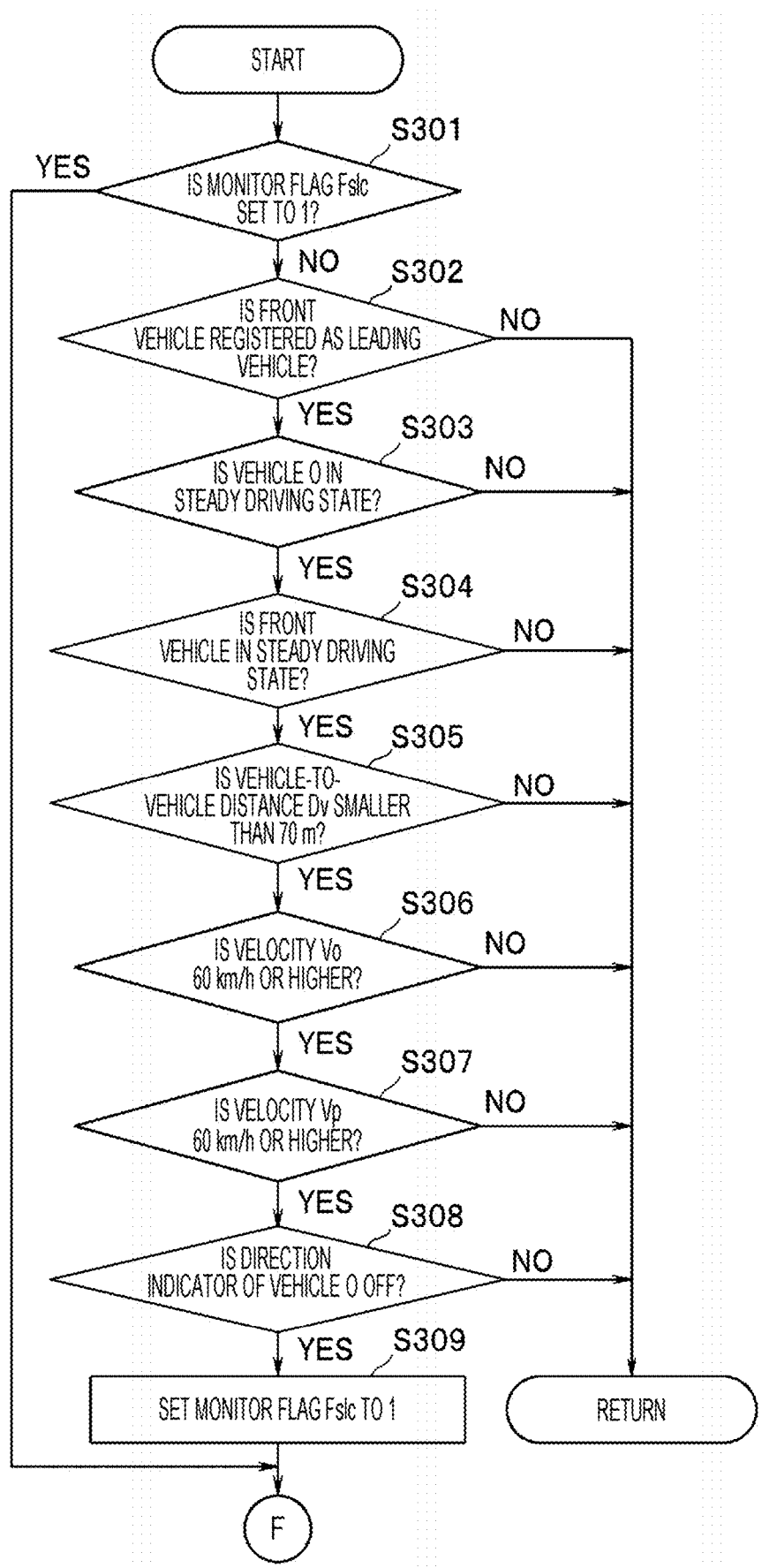
FIGS. 15 and 16 are a flowchart illustrating a synchro-lane-change monitor determining routine.
Figure 16:
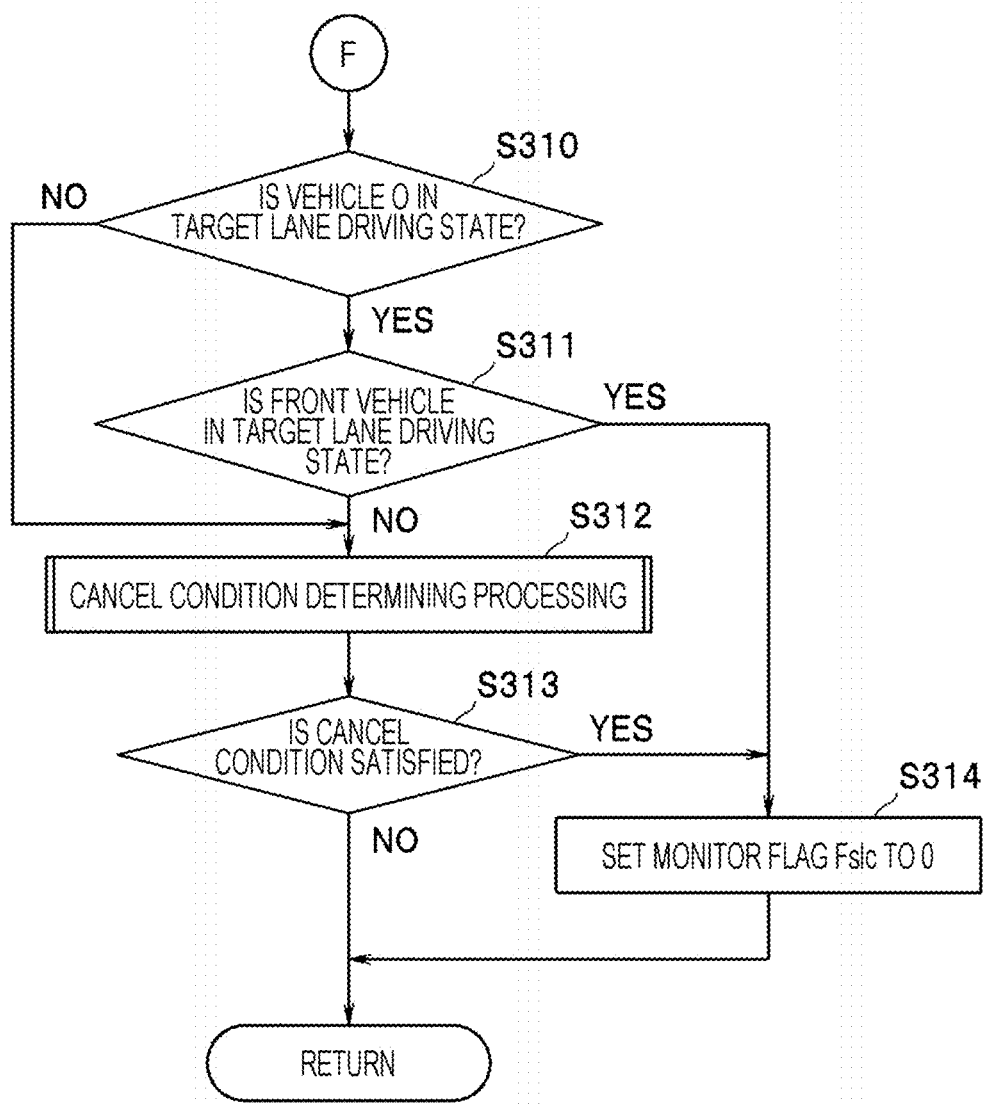
Figure 17:
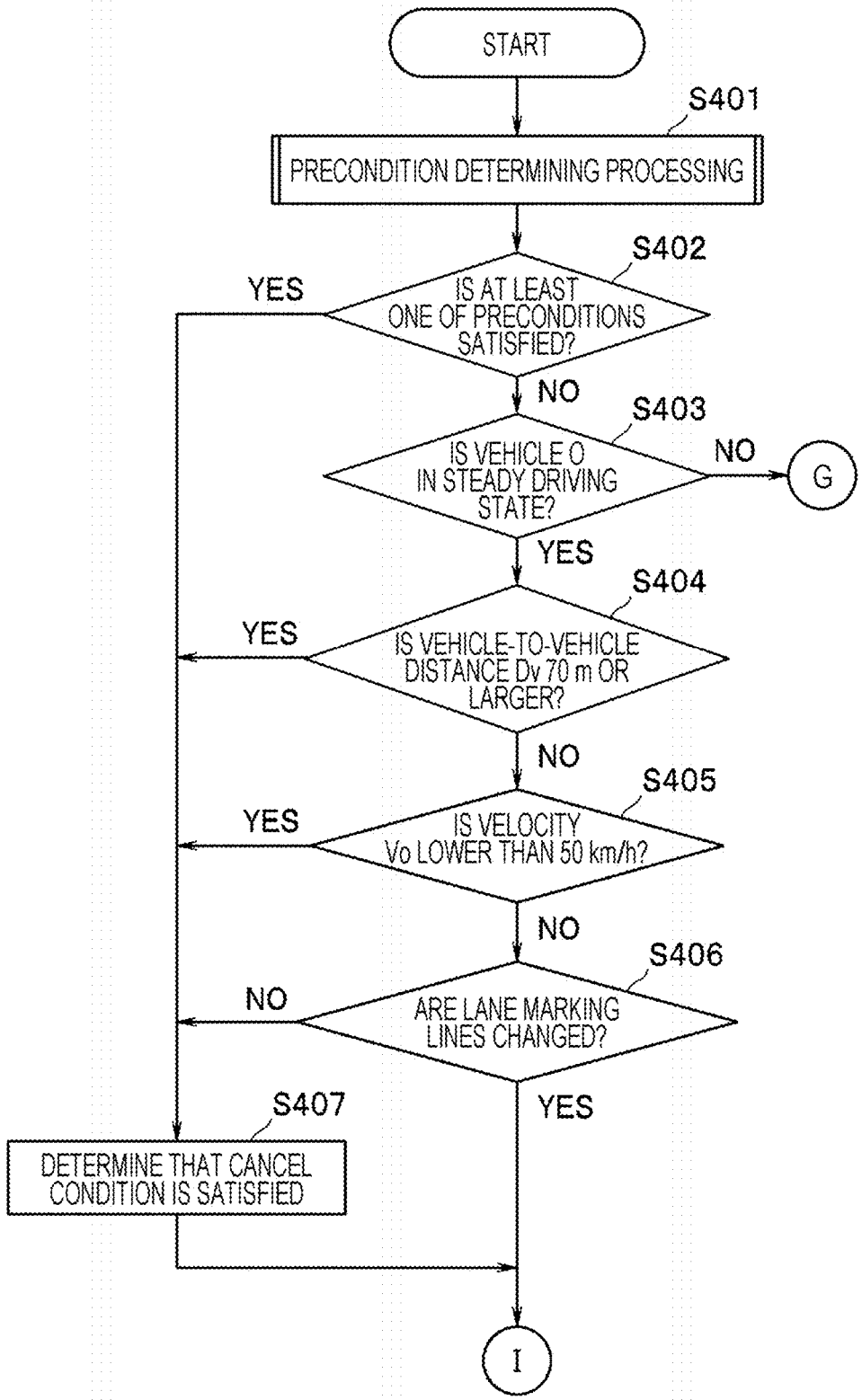
FIGS. 17 through 22 are a flowchart illustrating a cancel condition determining subroutine for synchro-lane-change monitor determining processing.
Figure 18:
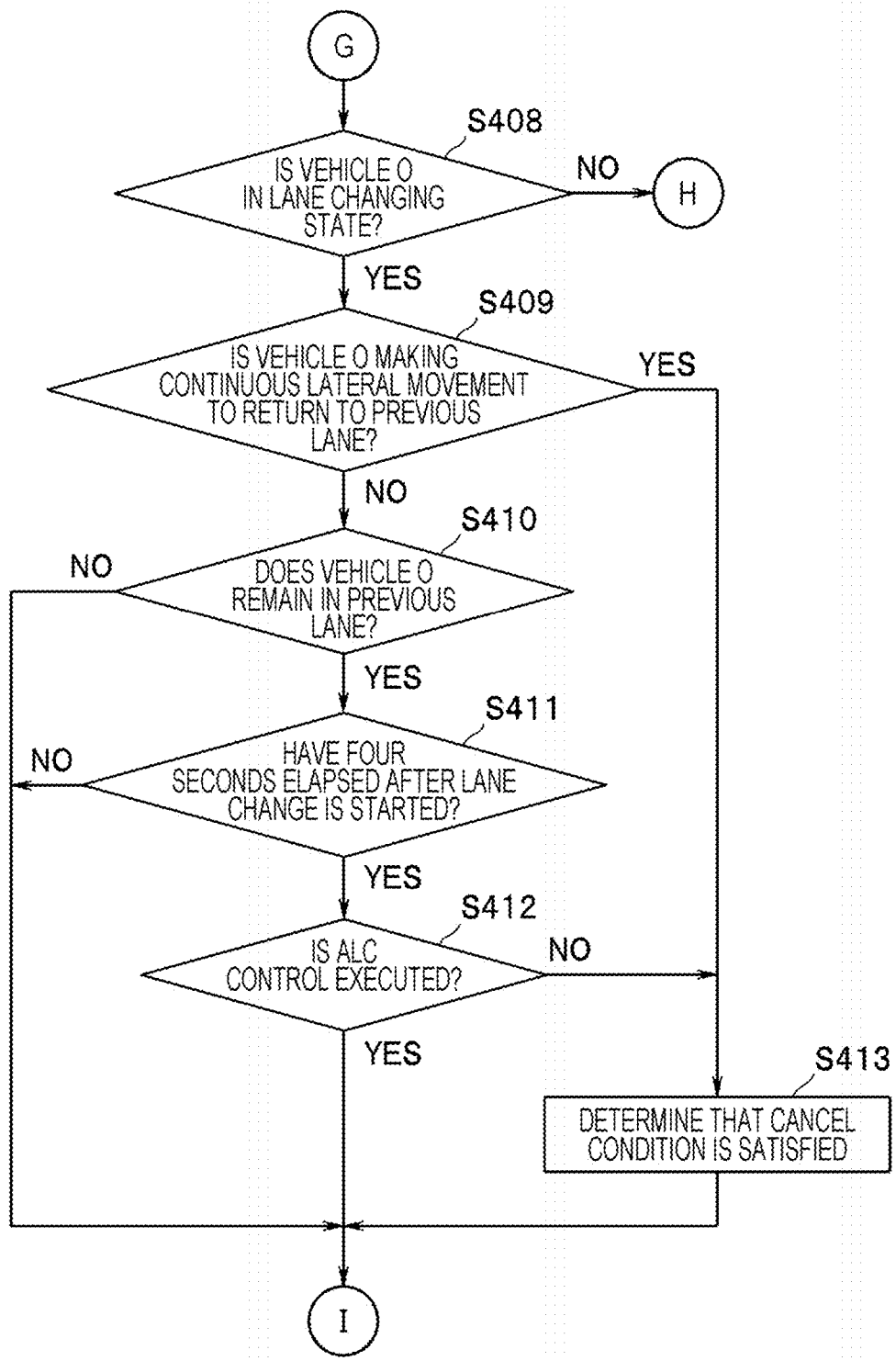
Figure 19:
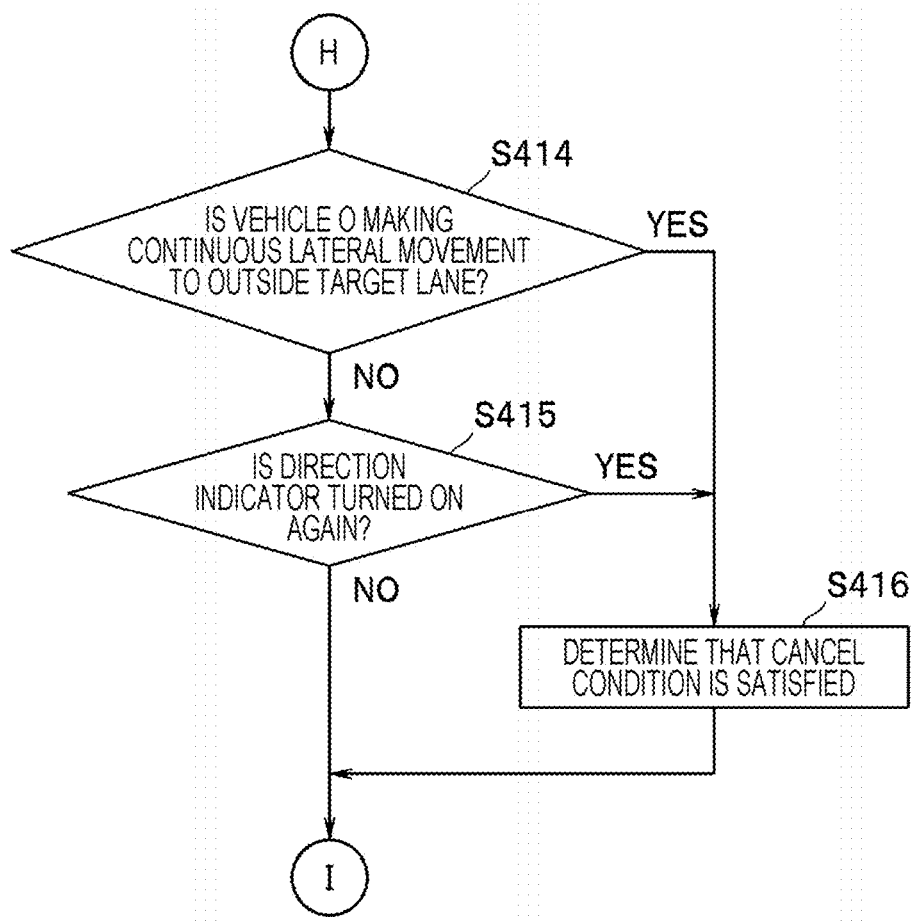
Figure 20:
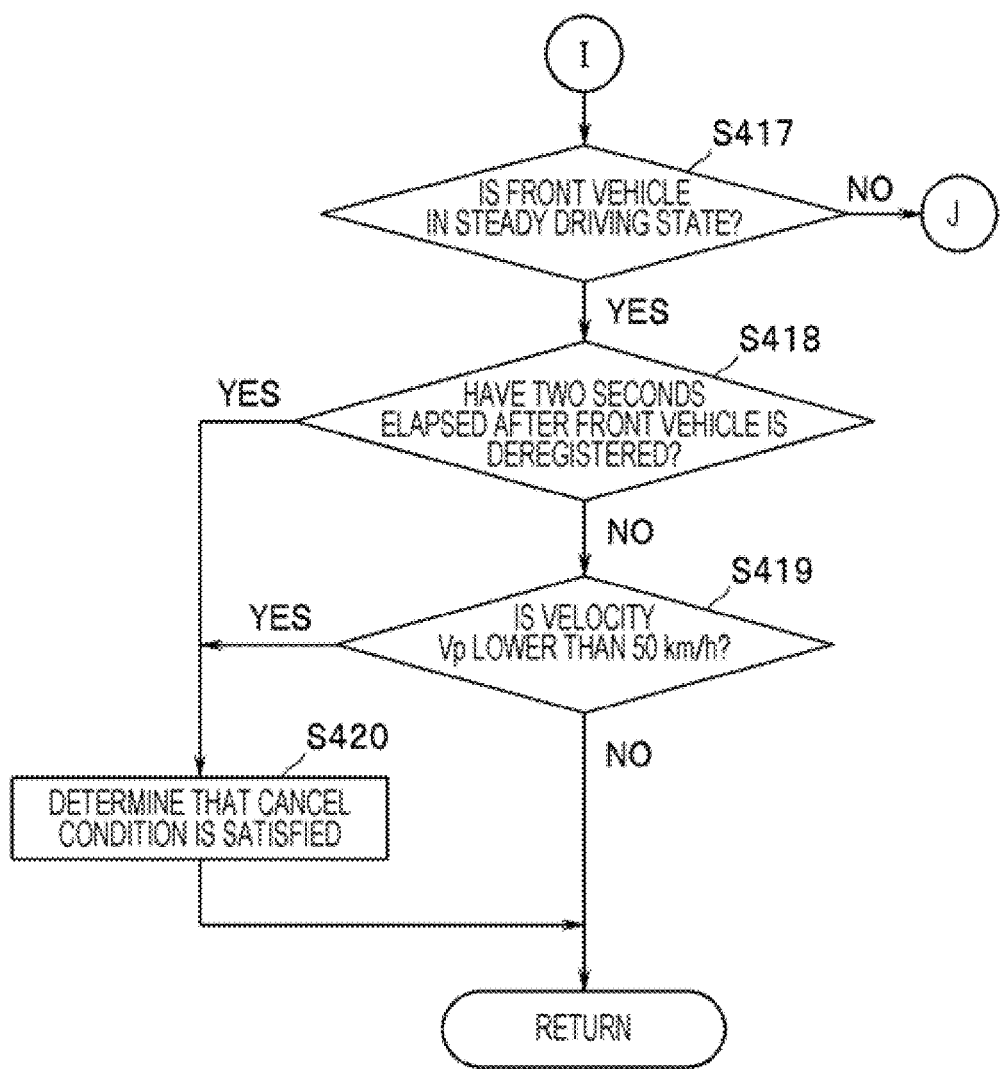
Figure 21:
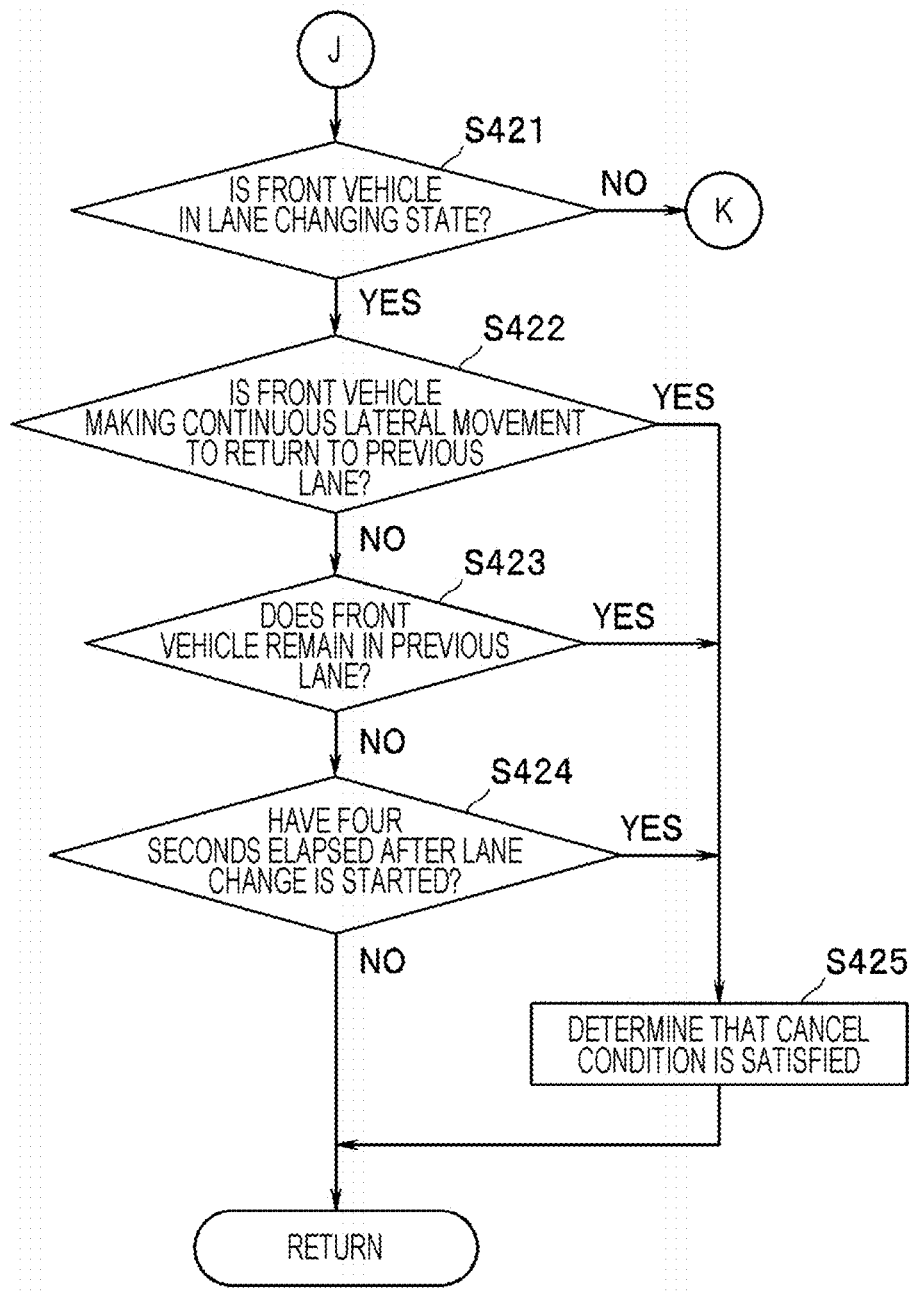
Figure 22:
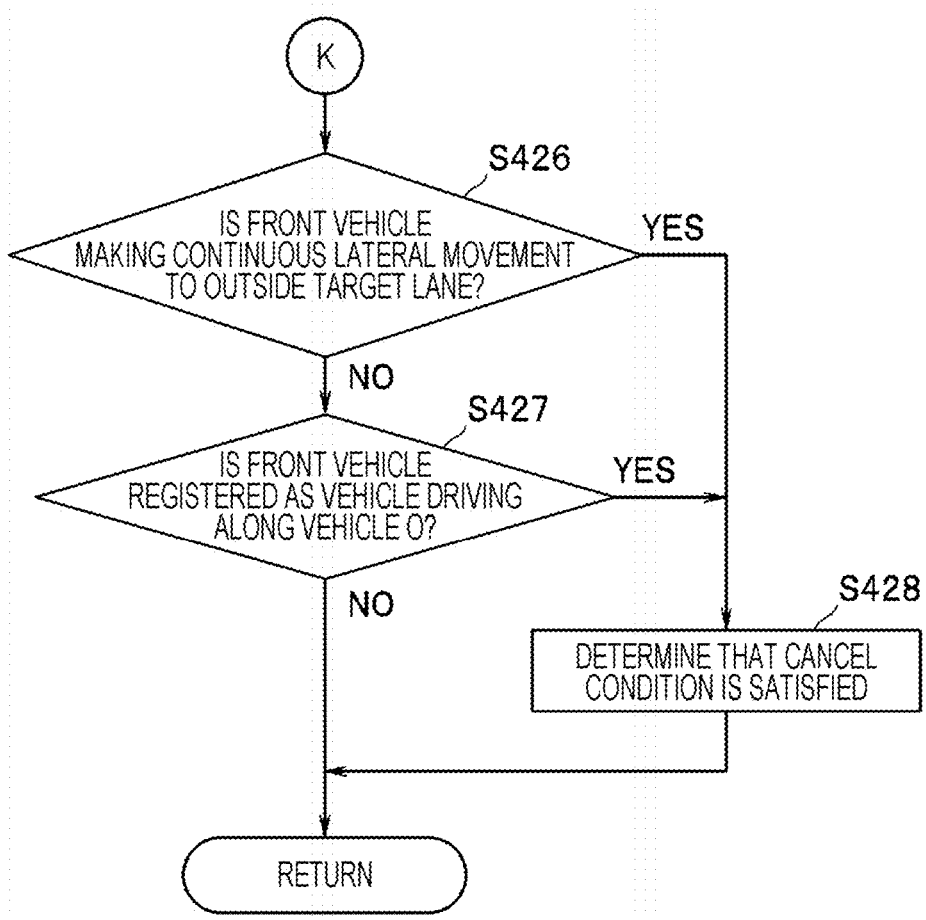

Processing for determining whether a front vehicle P will be a target for synchro-lane-change monitoring will now be described below with reference to the flowchart of a synchro-lane-change monitor determining routine illustrated in FIGS. 15 and 16. This routine is repeatedly executed by the driving_ECU 14 at regular set time intervals.

After the routine starts, in step S301, the driving_ECU 14 checks whether the monitor flag Fslc for a front vehicle P is set to "1". That is, the driving_ECU 14 checks whether the front vehicle P is already registered as a target for synchro-lane-change monitoring.

Then, if it is determined in step S301 that the monitor flag Fslc is set to "1" (YES in step S301), the driving_ECU 14 proceeds to step S310.

If it is determined in step S301 that the monitor flag Fslc is cleared to "0" (NO in step S301), the driving_ECU 14 proceeds to step S302.

In step S302, the driving_ECU 14 checks whether the front vehicle P is registered as a leading vehicle L.

If it is determined in step S302 that the front vehicle P is not registered as a leading vehicle L (NO in step S302), the driving_ECU 14 exits from the routine.

If it is determined in step S302 that the front vehicle P is registered as a leading vehicle L (YES in step S302), the driving_ECU 14 proceeds to step S303.

In step S303, the driving_ECU 14 checks whether the driving state of the vehicle O is the steady driving state.

If it is determined in step S303 that the driving state of the vehicle O is not the steady driving state (NO in step S303), the driving_ECU 14 exits from the routine.

If it is determined in step S303 that the driving state of the vehicle O is the steady driving state (YES in step S303), the driving_ECU 14 proceeds to step S304.

In step S304, the driving_ECU 14 checks whether the driving state of the front vehicle P (leading vehicle L) is the steady driving state.

If it is determined in step S304 that the driving state of the front vehicle P is not the steady driving state (NO in step S304), the driving_ECU 14 exits from the routine.

If it is determined in step S304 that the driving state of the front vehicle P is the steady driving state (YES in step S304), the driving_ECU 14 proceeds to step S305.

In step S305, the driving_ECU 14 checks whether the vehicle-to-vehicle distance Dv between the vehicle O and the front vehicle P is 70 [m] or smaller, for example.

If it is determined in step S305 that the vehicle-to-vehicle distance Dv is greater than or equal to 70 [m] (NO in step S305), the driving_ECU 14 exits from the routine. That is, if the vehicle-to-vehicle distance Dv is sufficiently large, performing a synchro lane change has little influence on the vehicle O, and the driving_ECU 14 thus exits from the routine.

If it is determined in step S305 that the vehicle-to-vehicle distance Dv is smaller than 70 [m] (YES in step S305), the driving_ECU 14 proceeds to step S306.

In step S306, the driving_ECU 14 checks whether the velocity Vo of the vehicle O is 60 [km/h] or higher, for example.

If it is determined in step S306 that the velocity Vo of the vehicle O is lower than 60 [km/h] (NO in step S306), the driving_ECU 14 exits from the routine. That is, if the velocity Vo of the vehicle O is low, the occurrence of a certain incident, such as traffic congestion, is conceivable, and in such a driving environment, performing a synchro lane change has little influence on the vehicle O, and the driving_ECU 14 thus exits from the routine.

If it is determined in step S306 that the velocity Vo of the vehicle O is 60 [km/h] or higher (YES in step S306), the driving_ECU 14 proceeds to step S307.

In step S307, the driving_ECU 14 checks whether the velocity Vp of the front vehicle P is 60 [km/h] or higher, for example.

If it is determined in step S307 that the velocity Vp of the front vehicle P is lower than 60 [km/h] (NO in step S307), the driving_ECU 14 exits from the routine. That is, if the velocity Vp of the front vehicle P is low, the occurrence of a certain incident, such as traffic congestion, is conceivable, and in such a driving environment, performing a synchro lane change has little influence on the vehicle O, and the driving_ECU 14 thus exits from the routine.

If it is determined in step S307 that the velocity Vp of the front vehicle P is 60 [km/h] or higher (YES in step S307), the driving_ECU 14 proceeds to step S308.

In step S308, the driving_ECU 14 checks whether the direction indicator of the vehicle O is OFF.

If it is determined in step S308 that the direction indicator of the vehicle O is ON (NO in step S308), the driving_ECU 14 exits from the routine. That is, if the vehicle O changes lanes immediately after the vehicle O and the front vehicle P have entered the steady driving state, the driving_ECU 14 exits from the routine without setting the monitor flag Fslc.

If it is determined in step S308 that the direction indicator of the vehicle O is OFF (YES in step S308), the driving_ECU 14 proceeds to step S309.

In step S309, the driving_ECU 14 sets the monitor flag Fslc to "1" and proceeds to step S310.

After the driving_ECU 14 proceeds from step S301 or S309 to step S310, it checks whether the driving state of the vehicle O is the target lane driving state.

If it is determined in step S310 that the driving state of the vehicle O is not the target lane driving state (NO in step S310), the driving_ECU 14 proceeds to step S312.

If it is determined in step S310 that the driving state of the vehicle O is the target lane driving state (YES in step S310), the driving_ECU 14 proceeds to step S311.

In step S311, the driving_ECU 14 checks whether the driving state of the front vehicle P is the target lane driving state.

If it is determined in step S311 that the driving state of the front vehicle P is not the target lane driving state (NO in step S311), the driving_ECU 14 proceeds to step S312.

If it is determined in step S311 that the driving state of the front vehicle P is the target lane driving state (YES in step S311), the driving_ECU 14 proceeds to step S314. That is, if it is determined that the driving state of the vehicle O and that of the front vehicle P are both the target lane driving state, the driving_ECU 14 proceeds to step S314.

After the driving_ECU 14 proceeds from step S310 or S311 to step S312, it determines whether a cancel condition for synchro-lane-change monitoring is satisfied. Step S312 is executed in accordance with the flowchart of a cancel condition determining subroutine, which will be discussed later.

In step S313, the driving_ECU 14 checks whether the cancel condition is satisfied.

If it is determined in step S313 that the cancel condition is not satisfied (NO in step S313), the driving_ECU 14 exits from the routine.

If it is determined in step S313 that the cancel condition is satisfied (YES in step S313), the driving_ECU 14 proceeds to step S314.

After the driving_ECU 14 proceeds from step S311 or S313 to step S314, it clears the monitor flag Fslc to "0" and exits from the routine.

Cancel condition determining processing executed in step S312 in synchro-lane-change monitoring will be described below in accordance with the flowchart of the cancel condition determining subroutine illustrated in FIGS. 17 through 22. This subroutine is executed by the driving_ECU 14.

After the subroutine starts, in step S401, the driving_ECU 14 checks whether the vehicle O and the front vehicle P satisfy preconditions for canceling synchro-lane-change monitoring.

Examples of the preconditions are the following preconditions (a) through (f).
- (a) The estimated time-to-collision (TTC), which is a time before the vehicle O collides with the front vehicle P, is 1.5 seconds or smaller, for example. The estimated time-to-collision (TTC) can be calculated by dividing the relative distance between the vehicle O and the front vehicle P by the relative velocity of the vehicle O to the front vehicle P.
- (b) The steering angle of the vehicle O is 45 degrees or larger, for example. In such a case, it is highly likely that the vehicle O will turn left or right without changing lanes.
- (c) Three or smaller segments of lane marking lines are detected on the left and right sides. In such a case, there is a high possibility that lane marking lines are not sufficiently seen.
- (d) The lane changing direction of the vehicle O and that of the front vehicle P are different.
- (e) On the road where lane change is prohibited, one of the vehicle O and the front vehicle P is in the lane changing state or in the target lane driving state.
- (f) After one of the vehicle O and the front vehicle P has shifted to the target lane driving state after a lane change, the other one of the vehicle O and the front vehicle P maintains the steady driving state for four seconds or longer.

In step S402, the driving_ECU 14 checks whether at least one of the preconditions (a) through (f) is satisfied.

If it is determined that at least one of the preconditions (a) through (f) is satisfied (YES in step S402), the driving_ECU 14 proceeds to step S407.

If it is determined that none of the preconditions (a) through (f) are satisfied (NO in step S402), the driving_ECU 14 proceeds to step S403.

Figure 6:
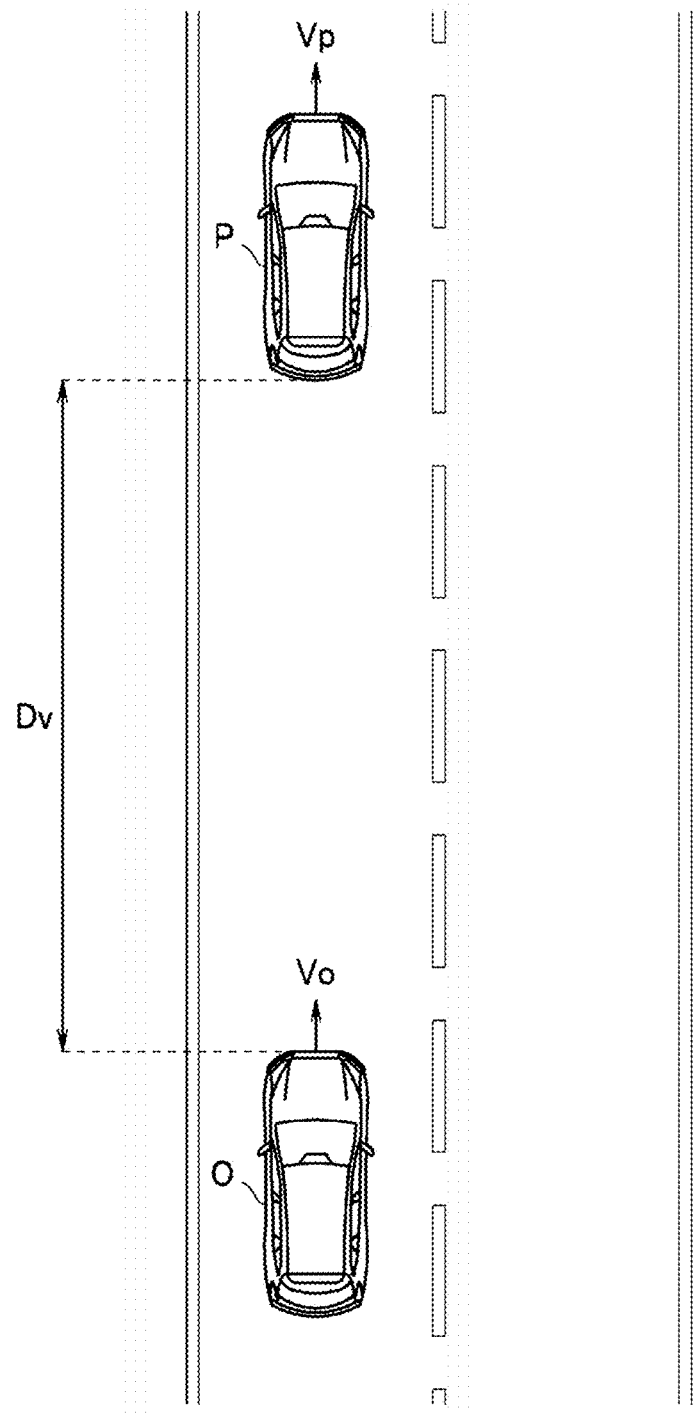
FIG. 6 is a schematic view for describing a condition for canceling the registration of a front vehicle.

In step S403, the driving_ECU 14 checks whether the driving state of the vehicle O is the steady driving state (see FIG. 6, for example).

If it is determined in step S403 that the driving state of the vehicle O is not the steady driving state (NO in step S403), the driving_ECU 14 proceeds to step S408.

If it is determined in step S403 that the driving state of the vehicle O is the steady driving state (YES in step S403), the driving_ECU 14 proceeds to step S404.

In step S404, the driving_ECU 14 checks whether the vehicle-to-vehicle distance Dv between the vehicle O and the front vehicle P is 70 [m] or larger, for example.

If it is determined in step S404 that the vehicle-to-vehicle distance Dv is 70 [m] or larger (YES in step S404), the driving_ECU 14 proceeds to step S407.

If it is determined in step S404 that the vehicle-to-vehicle distance Dv is smaller than 70 [m] (NO in step S404), the driving_ECU 14 proceeds to step S405.

In step S405, the driving_ECU 14 checks whether the velocity Vo of the vehicle O is lower than 50 [km/h], for example.

If it is determined in step S405 that the velocity Vo of the vehicle O is lower than 50 [km/h] (YES in step S405), the driving_ECU 14 proceeds to step S407.

If it is determined in step S405 that the velocity Vo of the vehicle O is 50 [km/h] or higher (NO in step S405), the driving_ECU 14 proceeds to step S406.

In step S406, the driving_ECU 14 checks whether the lane marking lines that define the driving lane of the vehicle O are changed despite that the driving state of the vehicle O is the steady driving state.

If it is determined in step S406 that the lane marking lines are not changed (NO in step S406), the driving_ECU 14 proceeds to step S407.

If it is determined in step S406 that the lane marking lines are changed (YES in step S406), the driving_ECU 14 proceeds to step S417.

After the driving_ECU 14 proceeds from step S402, S404, S405, or S406 to step S407, it determines that the cancel condition for synchro-lane-change monitoring is satisfied and proceeds to step S417.

Figure 7:
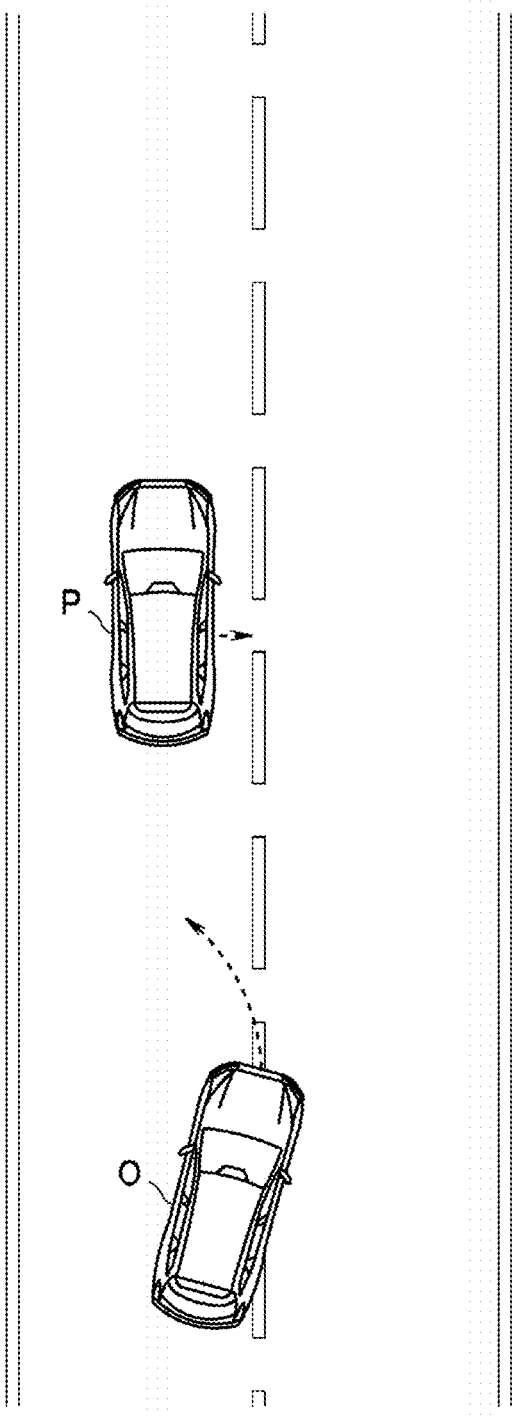
FIG. 7 is a schematic view for describing a condition for canceling the registration of a front vehicle.

After the driving_ECU 14 proceeds from step S403 to step S408, it checks whether the driving state of the vehicle O is the lane changing state (see FIG. 7).

If it is determined in step S408 that the driving state of the vehicle O is not the lane changing state (NO in step S408), the driving_ECU 14 proceeds to step S414.

If it is determined in step S408 that the driving state of the vehicle O is the lane changing state (YES in step S408), the driving_ECU 14 proceeds to step S409.

In step S409, the driving_ECU 14 checks whether the vehicle O is making a continuous lateral movement to return to the previous lane.

If it is determined in step S409 that the vehicle O is making a continuous lateral movement to return to the previous lane (YES in step S409), the driving_ECU 14 proceeds to step S413.

If it is determined in step S409 that the vehicle O is not making a continuous lateral movement to return to the previous lane (NO in step S409), the driving_ECU 14 proceeds to step S410.

In step S410, the driving_ECU 14 checks whether the vehicle O remains in the previous lane.

If it is determined in step S410 that the vehicle O does not remain in the previous lane (NO in step S410), the driving_ECU 14 proceeds to step S417.

If it is determined in step S410 that the vehicle O remains in the previous lane (YES in step S410), the driving_ECU 14 proceeds to step S411.

In step S411, the driving_ECU 14 checks whether four seconds or longer, for example, have elapsed after the vehicle O has started to change lanes. Typically, four seconds are the longest time for a driver to change lanes. However, changing lanes under auto lane change control may take more than four seconds after a lane change has started due to the nature of control.

If it is determined in step S411 that four seconds have not elapsed after the vehicle O has started to change lanes (NO in step S411), the driving_ECU 14 proceeds to step S417.

If it is determined in step S411 that four seconds have elapsed after the vehicle O has started to change lanes (YES in step S411), the driving_ECU 14 proceeds to step S412.

In step S412, the driving_ECU 14 checks whether the vehicle O has changed lanes under auto lane change control.

If it is determined in step S412 that auto lane change control is not executed to change lanes (NO in step S412), the driving_ECU 14 proceeds to step S413.

If it is determined in step S412 that auto lane change control is executed to change lanes (YES in step S412), the driving_ECU 14 proceeds to step S417.

After the driving_ECU 14 proceeds from step S409 or S412 to step S413, it determines that the cancel condition for synchro-lane-change monitoring is satisfied and proceeds to step S417.

Figure 8:
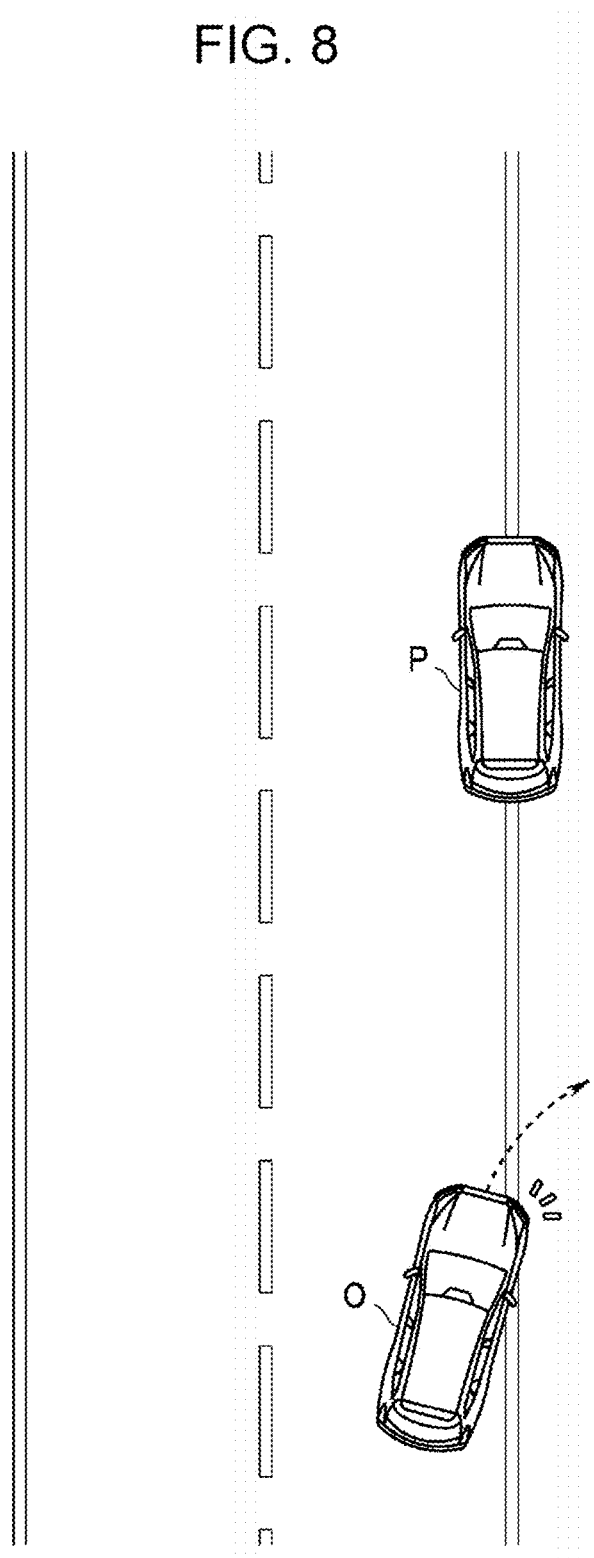
FIG. 8 is a schematic view for describing a condition for canceling the registration of a front vehicle.

After the driving_ECU 14 proceeds from step S408 to step S414, it checks whether the vehicle O is making a continuous lateral movement to outside a target lane. That is, if the driving state of the vehicle O is found to be the target lane driving state (see FIG. 8, for example), the driving_ECU 14 checks whether the vehicle O is making a continuous lateral movement to outside the target lane.

If it is determined in step S414 that the vehicle O is making a continuous lateral movement to outside the target lane (YES in step S414), the driving_ECU 14 proceeds to step S416.

If it is determined in step S414 that the vehicle O is not making a continuous lateral movement to outside the target lane (NO in step S414), the driving_ECU 14 proceeds to step S415.

In step S415, the driving_ECU 14 checks whether the direction indicator is turned ON again.

If it is determined in step S415 that the direction indicator is not turned ON again (NO in step S415), the driving_ECU 14 proceeds to step S417.

If it is determined in step S415 that the direction indicator is turned ON again (YES in step S415), the driving_ECU 14 proceeds to step S416.

After the driving_ECU 14 proceeds from step S414 or S415 to step S416, it determines that the cancel condition for synchro-lane-change monitoring is satisfied and proceeds to step S417.

After the driving_ECU 14 proceeds from step S406, S407, S410, S411, S412, S413, S415, or S416 to step S417, it determines whether the driving state of the front vehicle P is the steady driving state (see FIG. 6, for example).

If it is determined in step S417 that the driving state of the front vehicle P is not the steady driving state (NO in step S417), the driving_ECU 14 proceeds to step S421.

If it is determined in step S417 that the driving state of the front vehicle P is the steady driving state (YES in step S417), the driving_ECU 14 proceeds to step S418.

In step S418, the driving_ECU 14 checks whether two seconds, for example, have elapsed after the registration of the front vehicle P as a leading vehicle L is canceled.

If it is determined in step S418 that two seconds have elapsed after the registration of the front vehicle P as a leading vehicle L is canceled (YES in step S418), the driving_ECU 14 proceeds to step S420.

If it is determined in step S418 that the front vehicle L is still registered as a leading vehicle L or two seconds have not elapsed after the registration of the front vehicle P as a leading vehicle L is canceled (NO in step S418), the driving_ECU 14 proceeds to step S419.

In step S419, the driving_ECU 14 checks whether the velocity Vp of the front vehicle P is lower than 50 [km/h], for example.

If it is determined in step S419 that the velocity Vp of the front vehicle P is 50 [km/h] or higher (NO in step S419), the driving_ECU 14 exits from the routine.

If it is determined in step S419 that the velocity Vp of the front vehicle P is lower than 50 [km/h] (YES in step S419), the driving_ECU 14 proceeds to step S420.

After the driving_ECU 14 proceeds from step S418 or S419 to step S420, it determines that the cancel condition for synchro-lane-change monitoring is satisfied and exits from the routine.

After the driving_ECU 14 proceeds from step S417 to step S421, it checks whether the driving state of the front vehicle P is the lane changing state (see FIG. 7, for example).

If it is determined in step S421 that the driving state of the front vehicle P is not the lane changing state (NO in step S421), the driving_ECU 14 proceeds to step S426.

If it is determined in step S421 that the driving state of the front vehicle P is the lane changing state (YES in step S421), the driving_ECU 14 proceeds to step S422.

In step S422, the driving_ECU 14 checks whether the front vehicle P is making a continuous lateral movement to return to the previous lane.

If it is determined in step S422 that the front vehicle P is making a continuous lateral movement to return to the previous lane (YES in step S422), the driving_ECU 14 proceeds to step S425.

If it is determined in step S422 that the front vehicle P is not making a continuous lateral movement to return to the previous lane (NO in step S422), the driving_ECU 14 proceeds to step S423.

In step S423, the driving_ECU 14 checks whether the front vehicle P remains in the previous lane.

If it is determined in step S423 that the front vehicle P remains in the previous lane (YES in step S423), the driving_ECU 14 proceeds to step S425.

If it is determined in step S423 that the front vehicle P does not remain in the previous lane (NO in step S423), the driving_ECU 14 proceeds to step S424.

In step S424, the driving_ECU 14 checks whether four seconds or longer, for example, have elapsed after the front vehicle P has started to change lanes.

If it is determined in step S424 that four seconds have not elapsed after the front vehicle P has started to change lanes (NO in step S424), the driving_ECU 14 exits from the routine.

If it is determined in step S424 that four seconds have elapsed after the front vehicle P has started to change lanes (YES in step S424), the driving_ECU 14 proceeds to step S425.

After the driving_ECU 14 proceeds from step S422, S423, or S424 to step S425, it determines that the cancel condition for synchro-lane-change monitoring is satisfied and exits from the routine.

After the driving_ECU 14 proceeds from step S421 to step S426, it checks whether the front vehicle P is making a continuous lateral movement to outside a target lane. That is, if the driving state of the front vehicle P is found to be the target lane driving state (see FIG. 8, for example), the driving_ECU 14 checks whether the front vehicle P is making a continuous lateral movement to outside the target lane.

If it is determined in step S426 that the front vehicle P is making a continuous lateral movement to outside the target lane (YES in step S426), the driving_ECU 14 proceeds to step S428.

If it is determined in step S426 that the front vehicle P is not making a continuous lateral movement to outside the target lane (NO in step S426), the driving_ECU 14 proceeds to step S427.

In step S427, the driving_ECU 14 checks whether the front vehicle P is registered as a vehicle driving along the vehicle O.

If it is determined in step S427 that the front vehicle P is not registered as a vehicle driving along the vehicle O (NO in step S427), the driving_ECU 14 exits from the routine.

If it is determined in step S427 that the front vehicle P is registered as a vehicle driving along the vehicle O (YES in step S427), the driving_ECU 14 proceeds to step S428.

After the driving_ECU 14 proceeds from step S426 or S427 to step S428, it determines that the cancel condition for synchro-lane-change monitoring is satisfied and exits from the routine.

Figure 23:
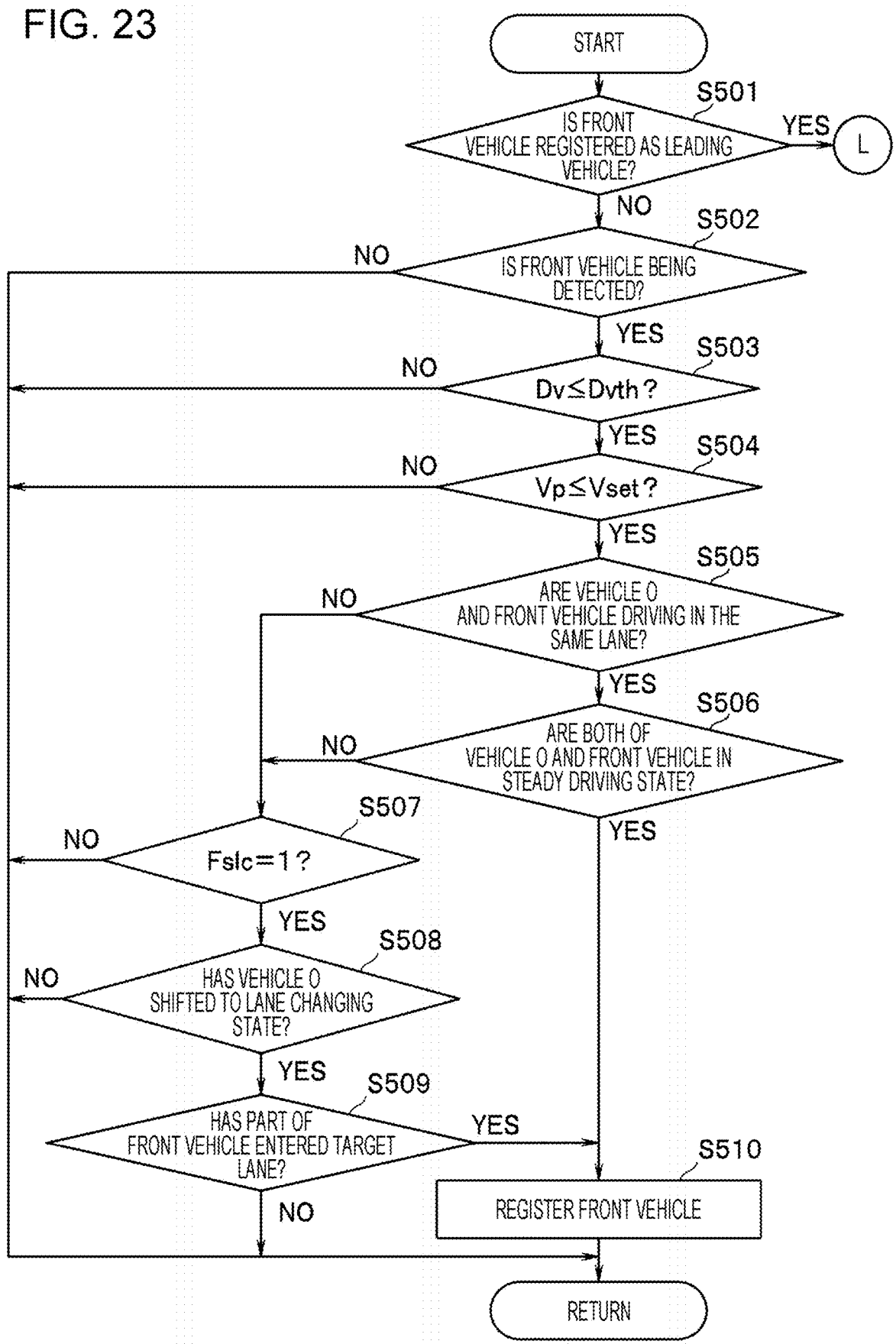
FIGS. 23 through 25 are a flowchart illustrating a leading vehicle register determining routine.
Figure 24:
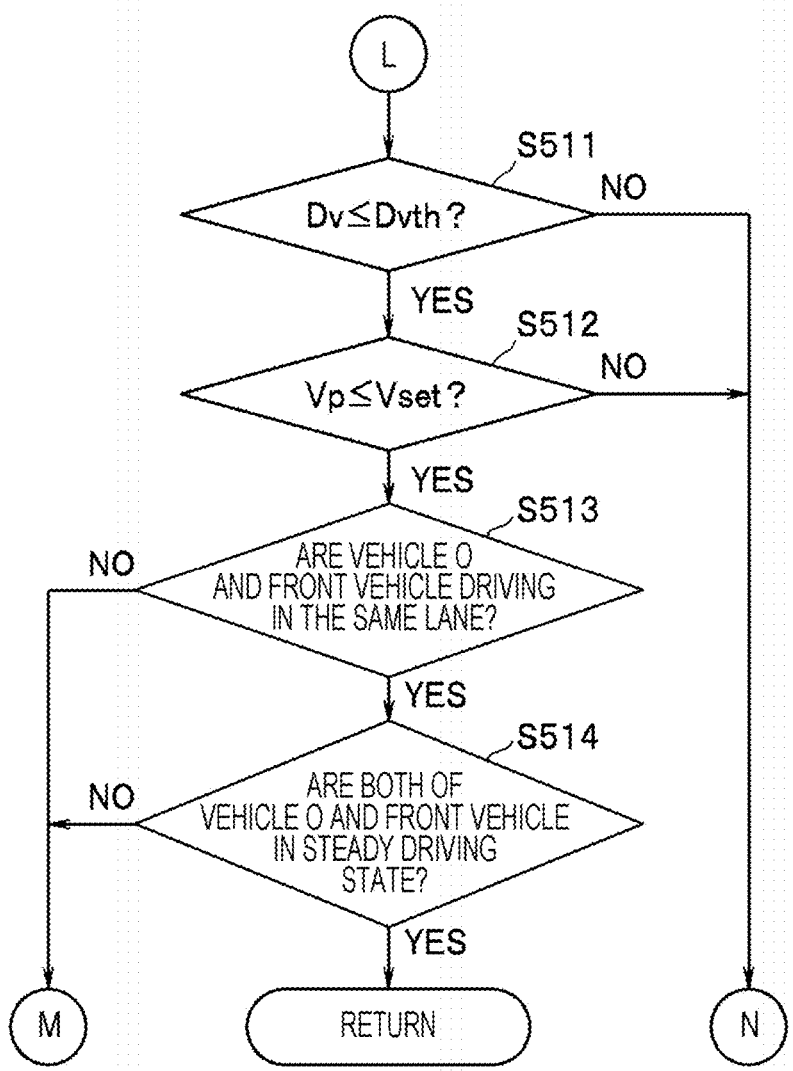
Figure 25:
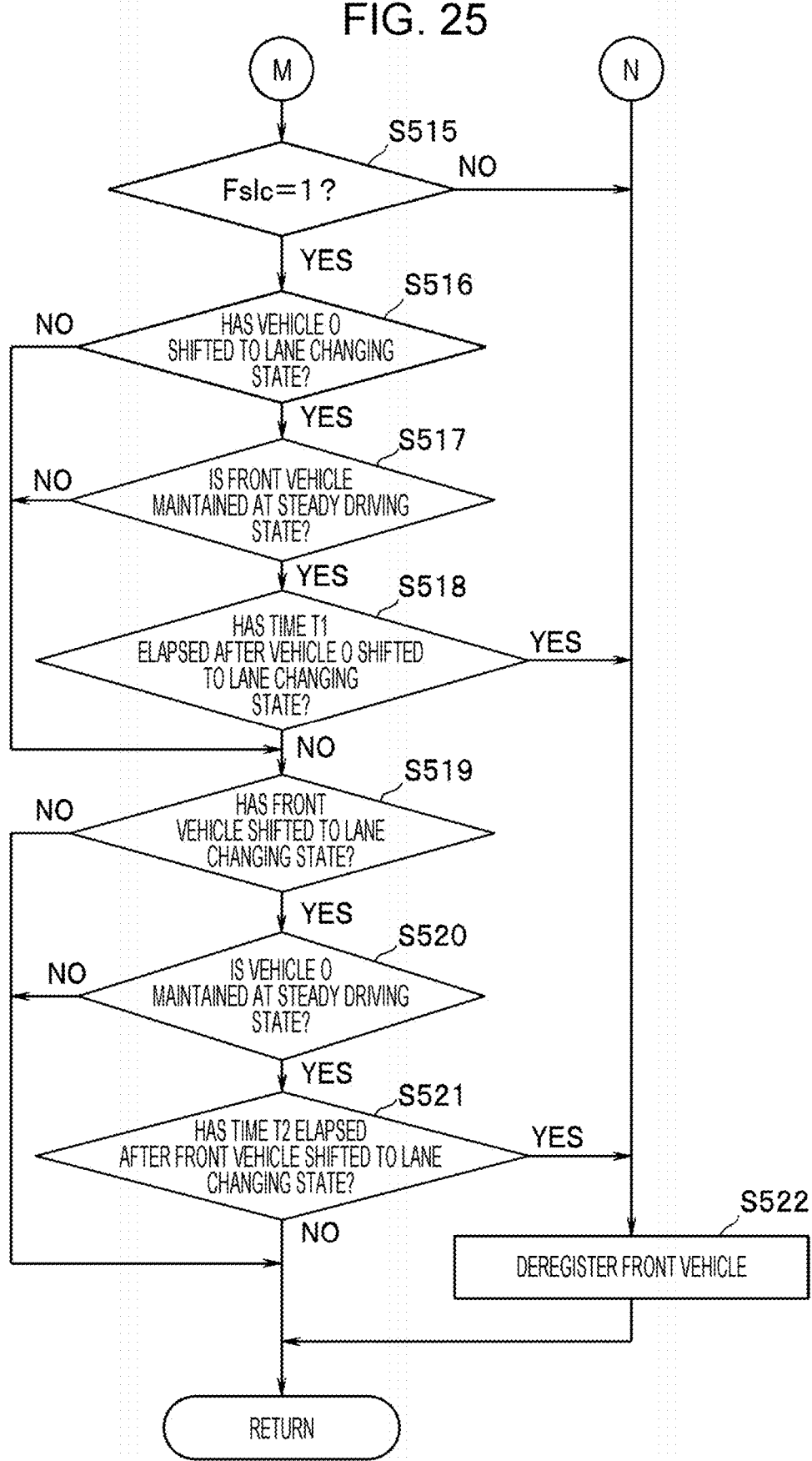

Processing for determining whether a front vehicle P will be registered as a leading vehicle L and whether a front vehicle P as a leading vehicle L will be deregistered will now be described below with reference to the flowchart of a leading vehicle register determining routine illustrated in FIGS. 23 through 25. This routine is repeatedly executed by the driving_ECU 14 at regular set time intervals.

After the routine starts, in step S501, the driving_ECU 14 checks whether a front vehicle P is registered as a leading vehicle L.

If it is determined in step S501 that no front vehicle P is registered as a leading vehicle L (NO in step S501), the driving_ECU 14 proceeds to step S502.

If it is determined in step S501 that a front vehicle P is registered as a leading vehicle L (YES in step S501), the driving_ECU 14 proceeds to step S511.

In step S502, the driving_ECU 14 checks whether a front vehicle P is being detected ahead of the vehicle O.

If it is determined in step S502 that no front vehicle P is being detected (NO in step S502), the driving_ECU 14 exits from the routine.

If it is determined in step S502 that a front vehicle P is being detected (YES in step S502), the driving_ECU 14 proceeds to step S503.

In step S503, the driving_ECU 14 checks whether the vehicle-to-vehicle distance Dv between the vehicle O and the front vehicle P is smaller than or equal to a threshold Dvth. The threshold Dvth is a variable value which can be set based on the velocity Vo of the vehicle O with reference to a preset map, for example. The threshold Dvth is set to a larger value as the velocity Vo is higher, for example.

If it is determined in step S503 that the vehicle-to-vehicle distance Dv is larger than the threshold Dvth (NO in step S503), the driving_ECU 14 exits from the routine.

If it is determined in step S503 that the vehicle-to-vehicle distance Dv is smaller than or equal to the threshold Dvth (YES in step S503), the driving_ECU 14 proceeds to step S504.

In step S504, the driving_ECU 14 checks whether the velocity Vp of the front vehicle P is lower than or equal to the set velocity Vset of the vehicle O.

If it is determined in step S504 that the velocity Vp is higher than the set velocity Vset (NO in step S504), the driving_ECU 14 exits from the routine.

If it is determined in step S504 that the velocity Vp is lower than or equal to the set velocity Vset (YES in step S504), the driving_ECU 14 proceeds to step S505.

In step S505, the driving_ECU 14 checks whether the vehicle O and the front vehicle P are driving in the same lane.

If it is determined in step S505 that the vehicle O and the front vehicle P are not driving in the same lane (NO in step S505), the driving_ECU 14 proceeds to step S507.

If it is determined in step S505 that the vehicle O and the front vehicle P are driving in the same lane (YES in step S505), the driving_ECU 14 proceeds to step S506.

In step S506, the driving_ECU 14 checks whether the driving state of the vehicle O and that of the front vehicle P are the steady driving state.

If it is determined in step S506 that the driving state of the vehicle O and that of the front vehicle P are the steady driving state (YES in step S506), the driving_ECU 14 proceeds to step S510.

If it is determined in step S506 that the driving state of at least one of the vehicle O and the front vehicle P is not the steady driving state (NO in step S506), the driving_ECU 14 proceeds to step S507.

In step S507, the driving_ECU 14 checks whether the monitor flag Fslc is set to "1". That is, the driving_ECU 14 checks whether the front vehicle P is a target of synchro-lane-change monitoring and the leading vehicle register condition for the front vehicle P is relaxed.

If it is determined in step S507 that the monitor flag Fslc is cleared to "0" (NO in step S507), the driving_ECU 14 exits from the routine.

If it is determined in step S507 that the monitor flag Fslc is set to "1" (YES in step S507), the driving_ECU 14 proceeds to step S508.

In step S508, the driving_ECU 14 checks whether the driving state of the vehicle O has shifted to the lane changing state.

If it is determined in step S508 that the driving state of the vehicle O has not shifted to the lane changing state (NO in step S508), the driving_ECU 14 exits from the routine.

If it is determined in step S508 that the driving state of the vehicle O has shifted to the lane changing state (YES in step S508), the driving_ECU 14 proceeds to step S509.

In step S509, the driving_ECU 14 checks whether part of the front vehicle P has entered a target lane. In one example, the driving_ECU 14 checks whether the front vehicle P has entered the same target lane as that to which the vehicle O has shifted and whether the front vehicle P has entered the target lane by 350 [mm] or greater, for example.

If it is determined in step S509 that part of the front vehicle P has not entered the target lane (NO in step S509), the driving_ECU 14 exits from the routine.

If it is determined in step S509 that part of the front vehicle P has entered the target lane (YES in step S509), the driving_ECU 14 proceeds to step S510.

That is, if the driving state of the vehicle O has shifted to the lane changing state (YES in step S508) and if part of the front vehicle P has entered the target lane (YES in step S509), the driving_ECU 14 determines that the vehicle O and the front vehicle P are performing a synchro lane change and proceeds to step S510.

After the driving_ECU 14 proceeds from step S506 or S509 to step S510, it registers the front vehicle P as a leading vehicle L and exists from the routine.

After the driving_ECU 14 proceeds from step S501 to step S511, it checks whether the vehicle-to-vehicle distance Dv between the vehicle O and the front vehicle P is smaller than or equal to the threshold Dvth. As described above when referring to step S503, the threshold Dvth is a variable value which can be set based on the velocity Vo of the vehicle O, for example.

If it is determined in step S511 that the vehicle-to-vehicle distance Dv is larger than the threshold Dvth (NO in step S511), the driving_ECU 14 proceeds to step S522.

If it is determined in step S511 that the vehicle-to-vehicle distance Dv is smaller than or equal to the threshold Dvth (YES in step S511), the driving_ECU 14 proceeds to step S512.

In step S512, the driving_ECU 14 checks whether the velocity Vp of the front vehicle P is lower than or equal to the set velocity Vset of the vehicle O.

If it is determined in step S512 that the velocity Vp is higher than the set velocity Vset (NO in step S512), the driving_ECU 14 proceeds to step S522.

If it is determined in step S512 that the velocity Vp is lower than or equal to the set velocity Vset (YES in step S512), the driving_ECU 14 proceeds to step S513.

In step S513, the driving_ECU 14 checks whether the vehicle O and the front vehicle P are driving in the same lane.

If it is determined in step S513 that the vehicle O and the front vehicle P are not driving in the same lane (NO in step S513), the driving_ECU 14 proceeds to step S515.

If it is determined in step S513 that the vehicle O and the front vehicle P are driving in the same lane (YES in step S513), the driving_ECU 14 proceeds to step S514.

In step S514, the driving_ECU 14 checks whether the driving state of the vehicle O and that of the front vehicle P are the steady driving state.

If it is determined in step S514 that the driving state of the vehicle O and that of the front vehicle P are the steady driving state (YES in step S514), the driving_ECU 14 exits from the routine.

If it is determined in step S514 that the driving state of at least one of the vehicle O and the front vehicle P is not the steady driving state (NO in step S514), the driving_ECU 14 proceeds to step S515.

In step S515, the driving_ECU 14 checks whether the monitor flag Fslc is set to "1". That is, the driving_ECU 14 checks whether the front vehicle P is a target of synchro-lane-change monitoring and the leading vehicle deregister condition for the front vehicle P (leading vehicle L) is relaxed.

If it is determined in step S515 that the monitor flag Fslc is cleared to "0" (NO in step S515), the driving_ECU 14 proceeds to step S522.

If it is determined in step S515 that the monitor flag Fslc is set to "1" (YES in step S515), the driving_ECU 14 proceeds to step S516.

In step S516, the driving_ECU 14 checks whether the driving state of the vehicle O has shifted to the lane changing state prior to the front vehicle P (leading vehicle L).

If it is determined in step S516 that the driving state of the vehicle O has not shifted to the lane changing state or the driving state of the front vehicle P has shifted to the lane changing state prior to the vehicle O (NO in step S516), the driving_ECU 14 proceeds to step S519.

If it is determined in step S516 that the driving state of the vehicle O has shifted to the lane changing state prior to the front vehicle P (YES in step S516), the driving_ECU 14 proceeds to step S517.

In step S517, the driving_ECU 14 checks whether the driving state of the front vehicle P (leading vehicle L) is maintained at the steady driving state.

If it is determined in step S517 that the driving state of the front vehicle P has shifted from the steady driving state to another driving state (NO in step S517), the driving_ECU 14 proceeds to step S519.

If it is determined in step S517 that the driving state of the front vehicle P is maintained at the steady driving state (YES in step S517), the driving_ECU 14 proceeds to step S518.

In step S518, the driving_ECU 14 checks whether a time T1 (five seconds, for example) has elapsed after the driving state of the vehicle O shifted to the lane changing state.

If it is determined in step S518 that the time T1 has elapsed after the driving state of the vehicle O shifted to the lane changing state (YES in step S518), the driving_ECU 14 proceeds to step S522. That is, if the time T1 has elapsed after the driving state of the vehicle O shifted to the lane changing state, the driving_ECU 14 determines that, even if the front vehicle P starts to change lanes, this action is not regarded as a synchro lane change with the vehicle O, and thus proceeds to step S522.

If it is determined in step S518 that the time T1 has not elapsed after the driving state of the vehicle O shifted to the lane changing state (NO in step S518), the driving_ECU 14 proceeds to step S519. In this manner, if the monitor flag Fslc is set to "1", the driving_ECU 14 relaxes the leading vehicle deregister condition and, even if the vehicle O has shifted to the lane changing state, the driving_ECU 14 monitors until the time T1 elapses whether the front vehicle P will perform a synchro lane change with the vehicle O.

After the driving_ECU 14 proceeds from step S516, S517, or S518 to step S519, it checks whether the driving state of the front vehicle P (leading vehicle L) has shifted to the lane changing state prior to the vehicle O.

If it is determined in step S519 that the driving state of the front vehicle P has not shifted to the lane changing state or the driving state of the vehicle O has shifted to the lane changing state prior to the front vehicle P (NO in step S519), the driving_ECU 14 exits from the routine.

If it is determined in step S519 that the driving state of the front vehicle P has shifted to the lane changing state prior to the vehicle O (YES in step S519), the driving_ECU 14 proceeds to step S520.

In step S520, the driving_ECU 14 checks whether the driving state of the vehicle O is maintained at the steady driving state.

If it is determined in step S520 that the driving state of the vehicle O has shifted from the steady driving state to another driving state (NO in step S520), the driving_ECU 14 exits from the routine.

If it is determined in step S520 that the driving state of the vehicle O is maintained at the steady driving state (YES in step S520), the driving_ECU 14 proceeds to step S521.

In step S521, the driving_ECU 14 checks whether a time T2 (two seconds, for example) has elapsed after the driving state of the front vehicle P shifted to the lane changing state.

If it is determined in step S521 that the time T2 has not elapsed after the driving state of the front vehicle P shifted to the lane changing state (NO in step S521), the driving_ECU 14 exits from the routine. In this manner, if the monitor flag Fslc is set to "1", the driving_ECU 14 relaxes the leading vehicle deregister condition and, even if the front vehicle P has shifted to the lane changing state, the driving_ECU 14 monitors until the time T2 elapses whether the vehicle O will perform a synchro lane change with the front vehicle P.

If it is determined in step S521 that the time T2 has elapsed after the driving state of the front vehicle P shifted to the lane changing state (YES in step S521), the driving_ECU 14 proceeds to step S522. That is, if the time T2 has elapsed after the driving state of the front vehicle P shifted to the lane changing state, the driving_ECU 14 determines that, even if the vehicle O starts to change lanes, this action is not regarded as a synchro lane change with the front vehicle P, and thus proceeds to step S522.

After the driving_ECU 14 proceeds from step S511, S512, S515, S518, or S521 to step S522, it deregisters the front vehicle P as a leading vehicle L and exists from the routine.

Figure 27:
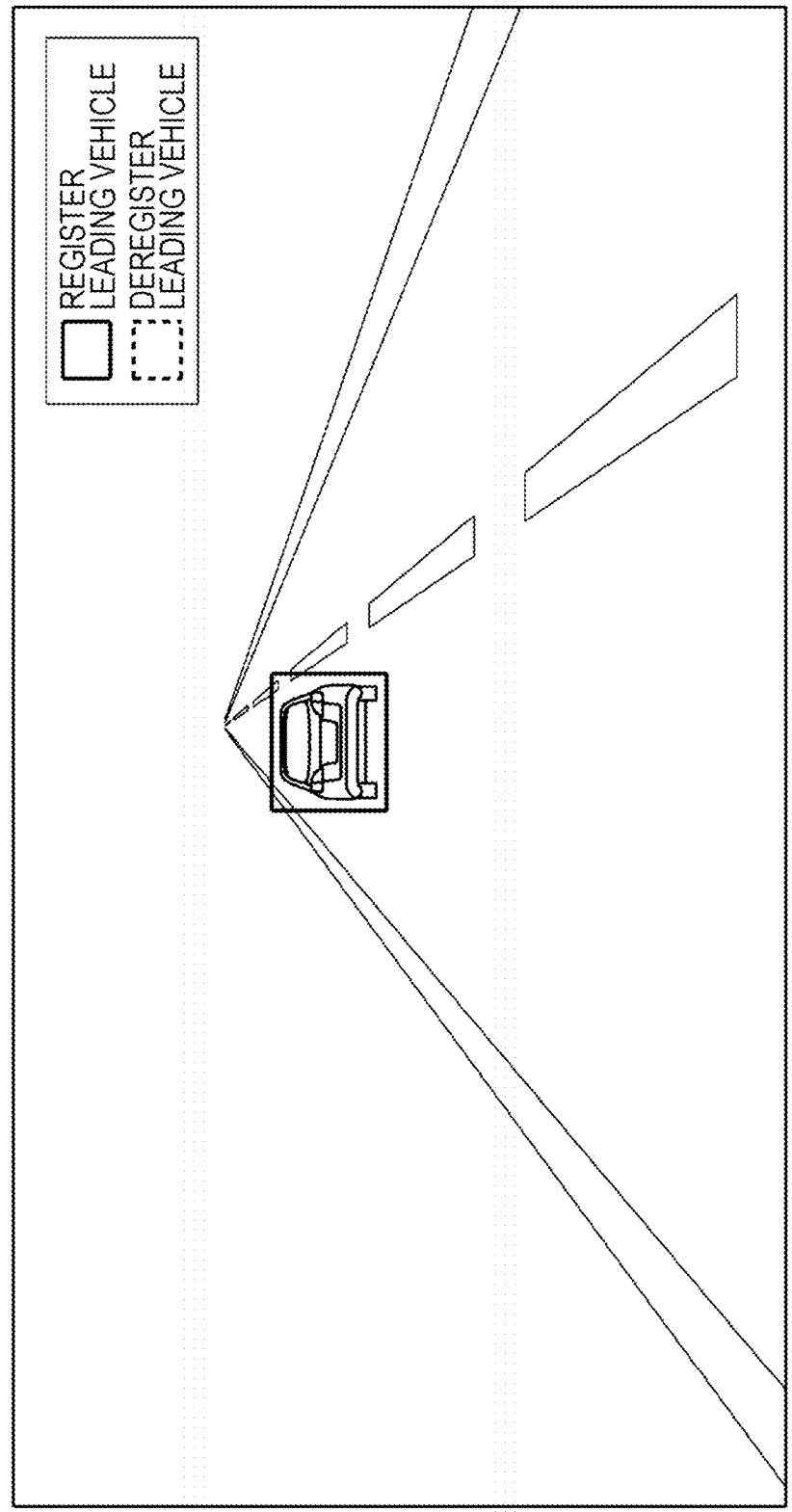
FIG. 27 is a schematic view for describing an example of the driving environment in front of a vehicle in the steady driving state.
Figure 28:
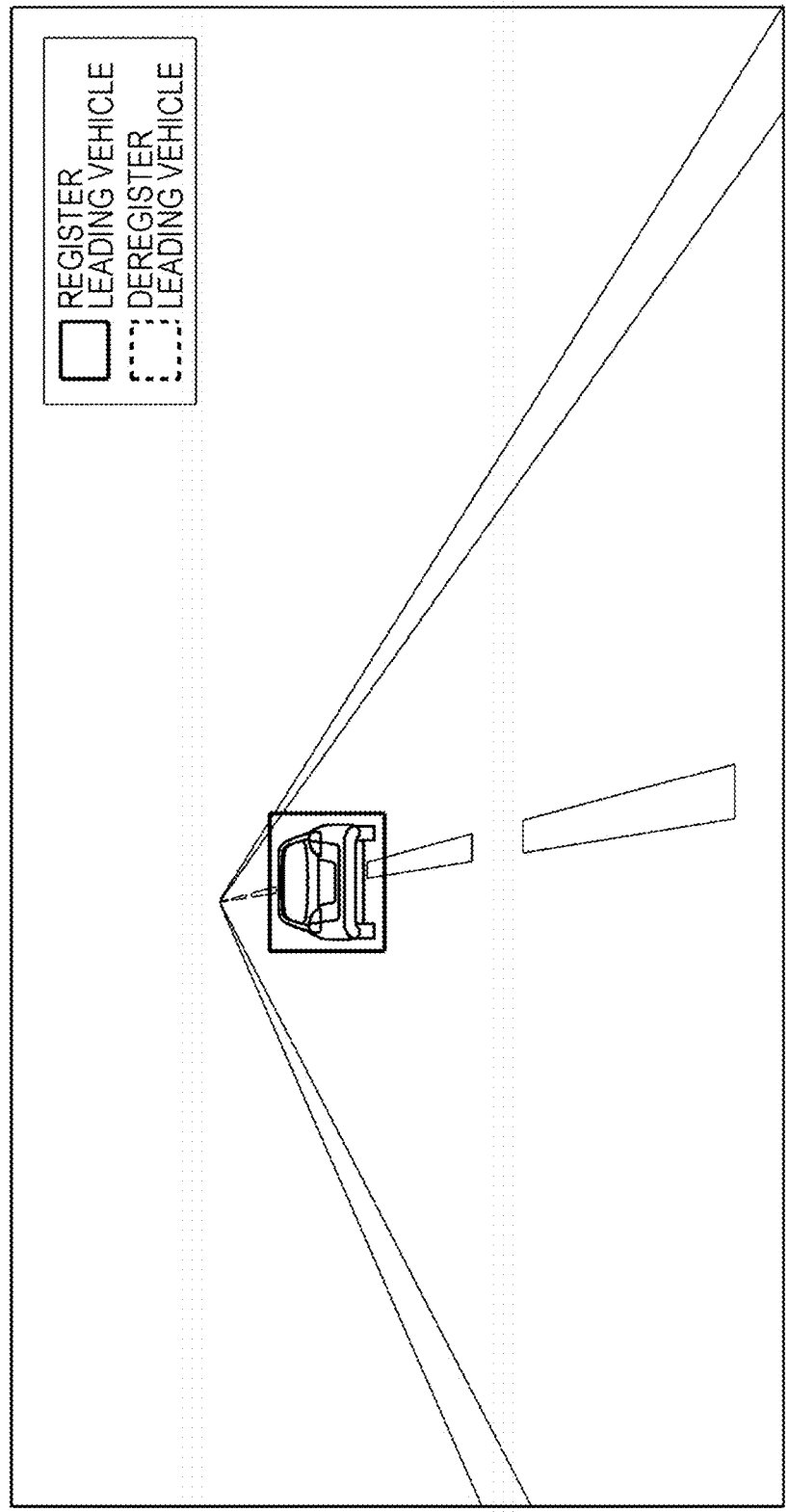
FIG. 28 is a schematic view for describing an example of the driving environment in front of a vehicle in the lane changing state.
Figure 29:
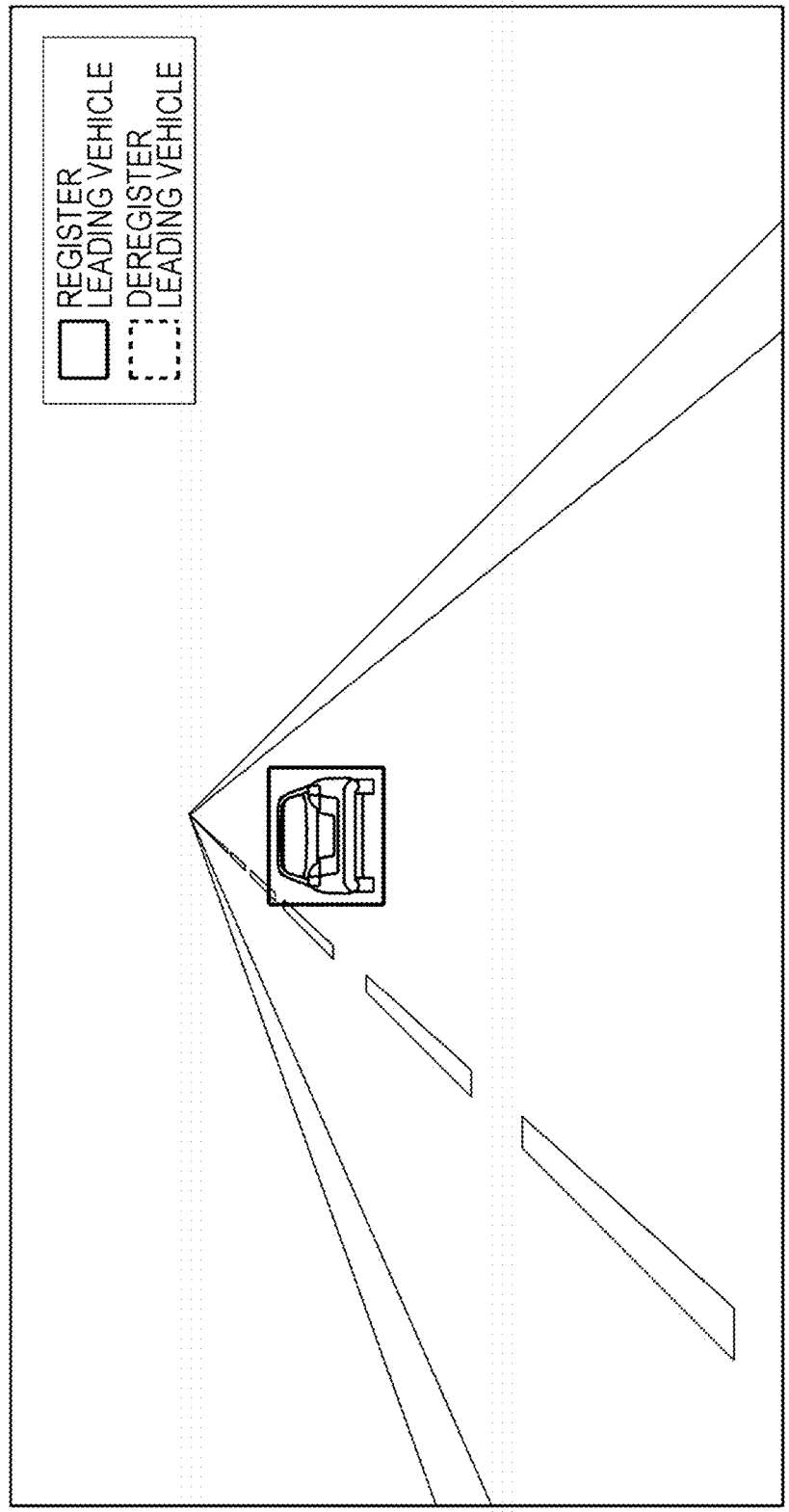
FIG. 29 is a schematic view for describing an example of the driving environment in front of a vehicle in the target lane driving state.

With the above-described leading vehicle register determining processing, if the monitor flag Fslc is set to "1", the leading vehicle register condition and the leading vehicle deregister condition have been relaxed. This can register a front vehicle P as a leading vehicle L under predetermined conditions even when the vehicle O has changed lanes. For example, even if the driving state of the vehicle O shifts from the steady driving state to the lane changing state and then to the target lane driving state as illustrated in FIGS. 27 through 29, the registration of a front vehicle P as a leading vehicle L can be maintained.

Figure 30:
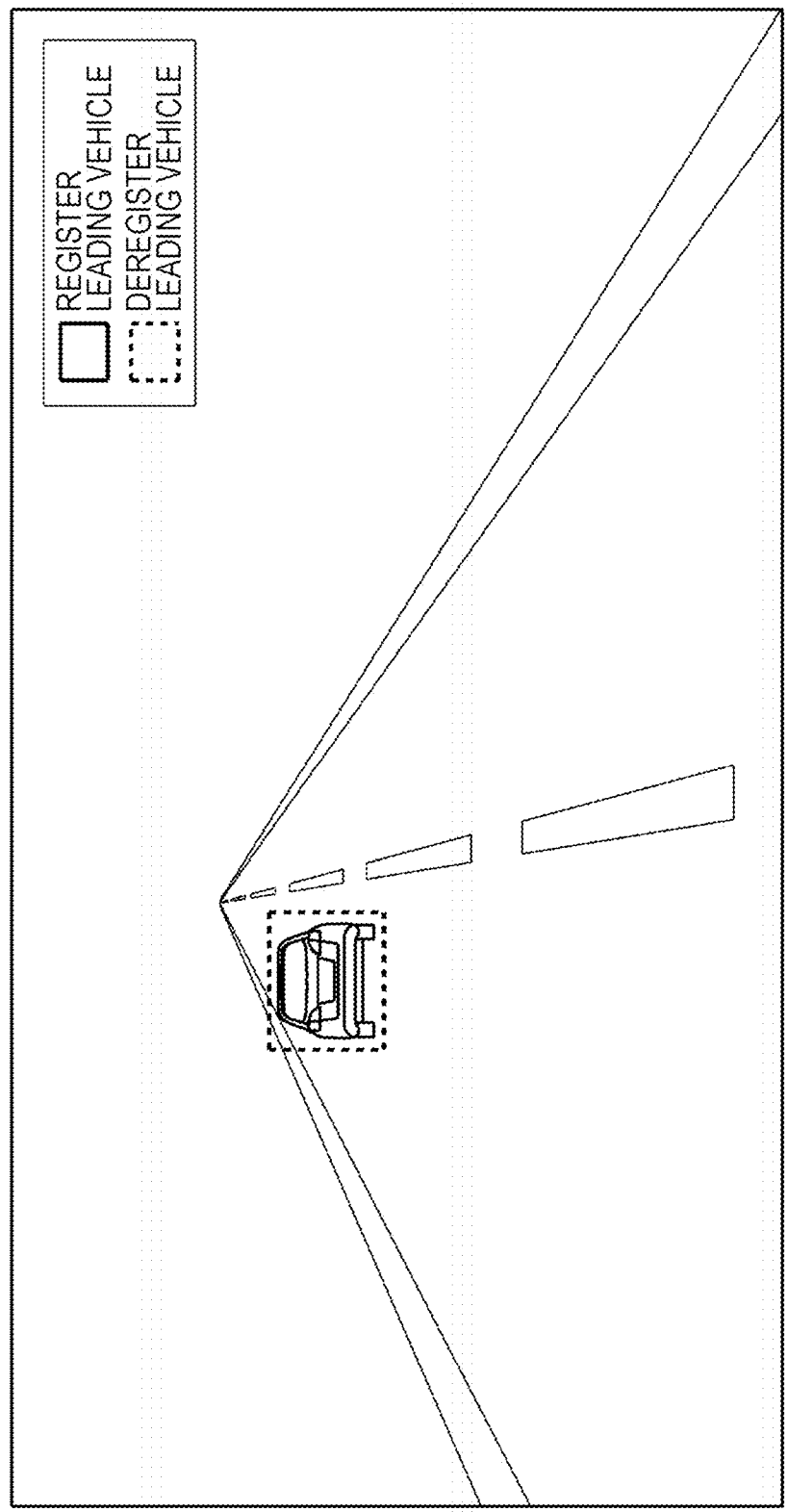
FIG. 30 is a schematic view for describing an example of the driving environment in front of a vehicle in the lane changing state.

If the monitor flag Fslc is cleared to "0", the registration of a front vehicle P as a leading vehicle L can easily be canceled when the driving state of the vehicle O has shifted to the lane changing state (see FIG. 30, for example).

Figure 26:
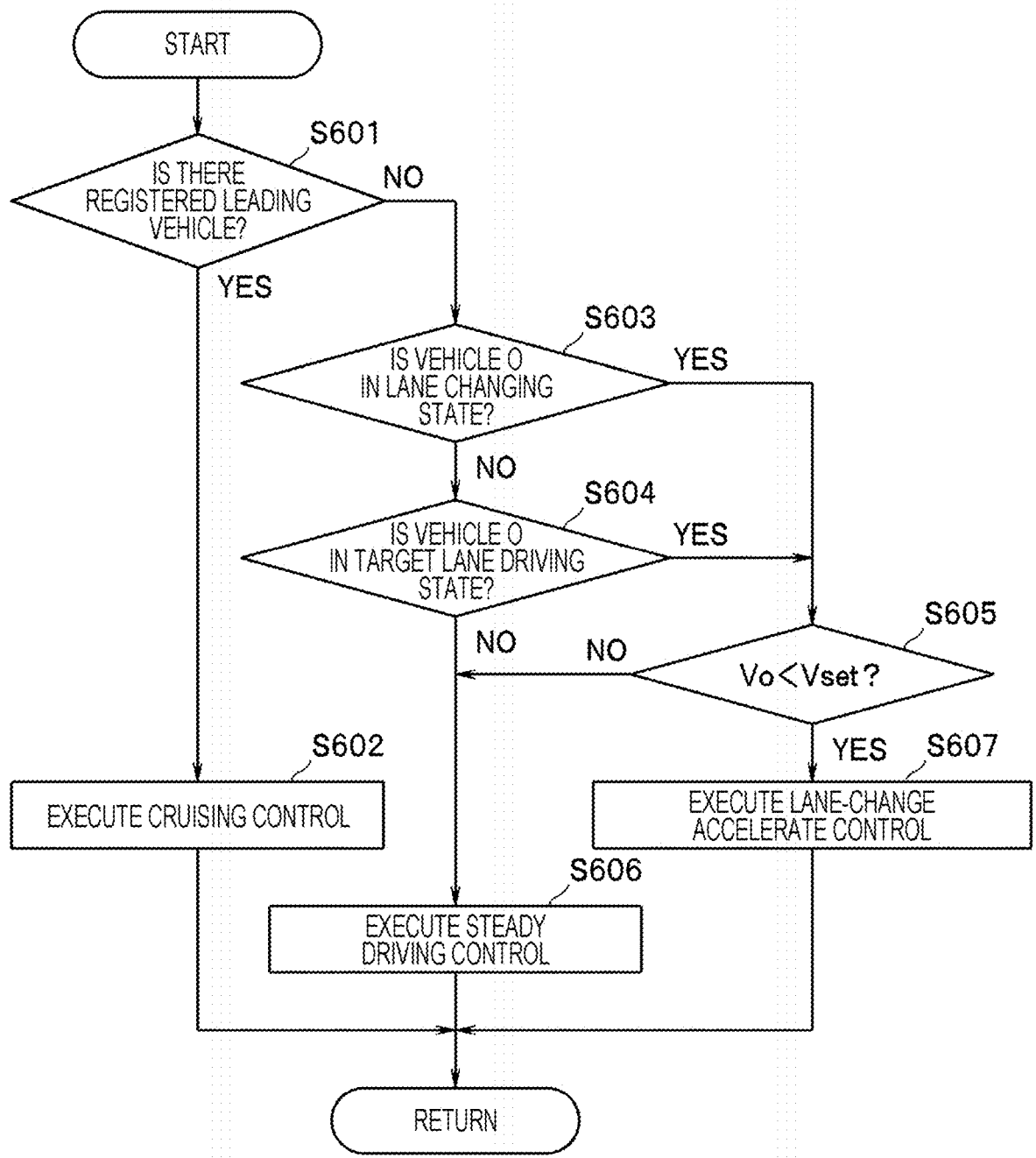
FIG. 26 is a flowchart illustrating an adaptive cruise control (ACC) routine.

ACC processing for the vehicle O will now be described below with reference to the flowchart of an ACC routine illustrated in FIG. 26. This routine is repeatedly executed by the driving_ECU 14 at regular set time intervals.

After the routine starts, in step S601, the driving_ECU 14 checks whether there is a leading vehicle L in front of the vehicle O. That is, the driving_ECU 14 checks whether a front vehicle P registered as a leading vehicle L is driving in front of the vehicle O.

If it is determined in step S601 that there is a leading vehicle L in front of the vehicle O (YES in step S601), the driving_ECU 14 proceeds to step S602.

In step S602, the driving_ECU 14 executes cruising control for the leading vehicle L and then exits from the routine.

If it is determined in step S601 that there is no leading vehicle L in front of the vehicle O (NO in step S601), the driving_ECU 14 proceeds to step S603.

In step S603, the driving_ECU 14 checks whether the driving state of the vehicle O is the lane changing state.

If it is determined in step S603 that the driving state of the vehicle O is the lane changing state (YES in step S603), the driving_ECU 14 proceeds to step S605.

If it is determined in step S603 that the driving state of the vehicle O is not the lane changing state (NO in step S603), the driving_ECU 14 proceeds to step S604.

In step S604, the driving_ECU 14 checks whether the driving state of the vehicle O is the target lane driving state.

If it is determined in step S604 that the driving state of the vehicle O is not the target lane driving state (NO in step S604), the driving_ECU 14 proceeds to step S606.

If it is determined in step S604 that the driving state of the vehicle O is the target lane driving state (YES in step S604), the driving_ECU 14 proceeds to step S605.

After the driving_ECU 14 proceeds from step S603 or S604 to step S605, it checks whether the velocity Vo of the vehicle O is lower than the set velocity Vset.

If it is determined in step S605 that the velocity Vo of the vehicle O is lower than the set velocity Vset (YES in step S605), the driving_ECU 14 executes lane-change accelerate control in step S607 and then exits from the routine.

If it is determined in step S605 that the velocity Vo of the vehicle O is higher than or equal to the set velocity Vset (NO in step S605), the driving_ECU 14 proceeds to step S606.

After the driving_ECU 14 proceeds from step S604 or S605 to step S606, it executes steady driving control and then exits from the routine.

According to the embodiment, the driving_ECU 14 classifies the driving state of the vehicle O as one of the steady driving state, the lane changing state, and the target lane driving state, based on information on the movement of the vehicle O in a lateral direction and information on the relative position of the vehicle O to a lane marking line. The driving_ECU 14 also extracts a vehicle driving in front of the vehicle O as a front vehicle P, based on driving environment information, and classifies the driving state of the front vehicle P as one of the steady driving state, the lane changing state, and the target lane driving state, based on information on the movement of the front vehicle P in a lateral direction and information on the relative position of the front vehicle P to a lane marking line. This makes it possible to suitably monitor the transition of the driving state of the vehicle O and that of the front vehicle P.

That is, the driving_ECU 14 determines the driving state of the vehicle O, based on information on the movement of the vehicle O in a lateral direction and information on the relative position of the vehicle O to a lane marking line. Likewise, the driving_ECU 14 determines the driving state of a front vehicle P, based on information on the movement of the front vehicle P in a lateral direction and information on the relative position of the front vehicle P to a lane marking line. This makes it possible to accurately determine the driving state of the vehicle O and that of the front vehicle P in various situations, such as in a lane change scene where it becomes unclear in which lane the vehicle O and the front vehicle P are driving. Based on the conditions for determining the driving state of a vehicle, the driving_ECU 14 can classify the driving state of the vehicle O and that of the front vehicle P as one of the steady driving state, the lane changing state, and the target lane driving state. This makes it possible to suitably monitor the transition of the driving state of the vehicle O and that of the front vehicle P from the start to the end of a lane change.

Additionally, classifying the driving state of the vehicle O and that of the front vehicle P as one of the steady driving state, the lane changing state, and the target lane driving state can easily determine whether the vehicle O and the front vehicle P are performing a synchro lane change within a predetermined time.

On condition that the vehicle O and the front vehicle P registered as a leading vehicle L are steadily driving in the same lane, the driving_ECU 14 starts to monitor whether the front vehicle P will perform a synchro lane change to the same target lane as the vehicle O. The driving_ECU 14 relaxes the leading vehicle register condition and the leading vehicle deregister condition while the front vehicle P is being monitored, compared with when the front vehicle P is not being monitored. This can decrease unwanted acceleration/deceleration at the time of a lane change.

That is, the driving_ECU 14 relaxes the leading vehicle register condition and the leading vehicle deregister condition for the front vehicle P when it is possible that the vehicle O and the front vehicle P will perform a synchro lane change to the same target lane. This can reduce the switching between the registering and deregistering of the front vehicle P in a short period of time, thereby decreasing unwanted acceleration/deceleration at the time of a lane change. In one example, the execution of unwanted lane-change accelerate control can effectively be avoided, thereby decreasing unwanted acceleration/deceleration at the time of a lane change.

While a front vehicle P is being monitored (when the monitor flag Fslc is set to "1") and also when it is registered as a leading vehicle L, even when one of the vehicle O and the front vehicle P has started to change lanes, the driving_ECU 14 does not cancel the registration of the front vehicle P for a set time, and when the other one of the vehicle O and the front vehicle P has started to shift to the same target lane within a set time, the driving_ECU 14 maintains the registration of the front vehicle P. This makes it possible to suitably maintain the registration of the front vehicle P as a leading vehicle L when the vehicle O and the front vehicle P perform a synchro lane change.

While a front vehicle P is being monitored (when the monitor flag Fslc is set to "1") and also when it is not registered as a leading vehicle L, when the vehicle O has started to change lanes, if the front vehicle P is changing to the same target lane as the vehicle O to a certain degree, the driving_ECU registers the front vehicle P as a leading vehicle L. With this operation, when the vehicle O and the front vehicle P perform a synchro lane change, the front vehicle P can be registered speedily even while the vehicle O is changing lanes.

In the above-described embodiment, certain elements, such as the image-recognition_ECU 13, driving_ECU 14, E/G_ECU 22, T/M_ECU 23, BK_ECU 24, and PS_ECU 25, are constituted by a known microcomputer including a central processing unit (CPU) and storages, such as a random access memory (RAM), a read only memory (ROM), and a non-volatile storage, and by peripheral devices. In the ROM, programs to be executed by the CPU and fixed data, such as data tables, are stored. All or some of the functions of the processor may be constituted by a logical circuit or an analog circuit. The programs may be executed by an electronic circuit, such as a field programmable gate array (FPGA).

The disclosure is not limited to the above-described embodiment and various modifications may be made without departing from the spirit and scope of the disclosure. For example, some of the elements disclosed in the embodiment may be omitted suitably.

The drive assist system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive assist system 1 including the image-recognition_ECU) 13, driving_ECU 14, E/G_ECU 22, T/M_ECU 23, BK_ECU 24, and PS_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive assist system configured to be applied to a vehicle, the drive assist system comprising:
   a driving environment recognizer configured to recognize information on a driving environment including a lane marking line and one or more vehicles driving on a road, the lane marking line being a line defining a lane on the road;
   a front vehicle extractor configured to extract, as a front vehicle, one of the one or more vehicles that is driving in front of the vehicle to which the drive assist system is configured to be applied, based on the information on the driving environment;
   a first driving state classifier configured to classify a driving state of the vehicle to which the drive assist system is configured to be applied as one of a first steady driving state, a first lane changing state, and a first target lane driving state, based on information on a movement of the vehicle in a lateral direction and information on a relative position of the vehicle to the lane marking line, the first steady driving state being a state in which the vehicle is steadily driving in the lane, the first lane changing state being a state in which the vehicle is changing the lane in the first steady driving state to a target lane adjacent to the lane, the first target lane driving state being a state in which the vehicle is driving in the target lane; and
   a second driving state classifier configured to classify a driving state of the front vehicle as one of a second steady driving state, a second lane changing state, and a second target lane driving state, based on information on a movement of the front vehicle in the lateral direction and information on a relative position of the front vehicle to the lane marking line, the second steady driving state being a state in which the front vehicle is steadily driving in the lane, the second lane changing state being a state in which the front vehicle is changing the lane in the second steady driving state to the target lane adjacent to the lane, the second target lane driving state being a state in which the front vehicle is driving in the target lane.

2. The drive assist system according to claim 1, further comprising:
   a synchro lane change determiner configured to determine whether the vehicle to which the drive assist system is configured to be applied and the front vehicle are changing lanes substantially in synchronization with each other within a set time, based on the driving state of the vehicle to which the drive assist system is configured to be applied and the driving state of the front vehicle.

3. A drive assist system configured to be applied to a vehicle, the drive assist system comprising:
   a driving environment recognition unit comprising a sensor configured to recognize information on a driving environment including a lane marking line and one or more vehicles driving on a road, the lane marking line being a line defining a lane on the road; and
   a processor configured to
      extract, as a front vehicle, one of the one or more vehicles that is driving in front of the vehicle to which the drive assist system is configured to be applied, based on the information on the driving environment,
      classify a driving state of the vehicle to which the drive assist system is configured to be applied as one of a first steady driving state, a first lane changing state, and a first target lane driving state, based on information on a movement of the vehicle in a lateral direction and information on a relative position of the vehicle to the lane marking line, the first steady driving state being a state in which the vehicle is steadily driving in the lane, the first lane changing state being a state in which the vehicle is changing the lane in the first steady driving state to a target lane adjacent to the lane, the first target lane driving state being a state in which the vehicle is driving in the target lane, and
      classify a driving state of the front vehicle as one of a second steady driving state, a second lane changing state, and a second target lane driving state, based on information on a movement of the front vehicle in the lateral direction and information on a relative position of the front vehicle to the lane marking line, the second steady driving state being a state in which the front vehicle is steadily driving in the lane, the second lane changing state being a state in which the front vehicle is changing the lane in the second steady driving state to the target lane adjacent to the lane, the second target lane driving state being a state in which the front vehicle is driving in the target lane.

* * * * *